US011514398B2

(12) United States Patent
Bogolea et al.

(10) Patent No.: US 11,514,398 B2
(45) Date of Patent: *Nov. 29, 2022

(54) METHOD FOR DEPLOYING FIXED AND MOBILE SENSORS FOR STOCK KEEPING IN A STORE

(71) Applicant: Simbe Robotics, Inc., San Francisco, CA (US)

(72) Inventors: Bradley Bogolea, San Francisco, CA (US); Durgesh Tiwari, San Francisco, CA (US)

(73) Assignee: Simbe Robotics, Inc., San Francisco, CA (US)

(*) Notice: Subject to any disclaimer, the term of this patent is extended or adjusted under 35 U.S.C. 154(b) by 25 days.

This patent is subject to a terminal disclaimer.

(21) Appl. No.: 17/113,877

(22) Filed: Dec. 7, 2020

(65) Prior Publication Data

US 2021/0117918 A1    Apr. 22, 2021

Related U.S. Application Data

(63) Continuation of application No. 16/817,972, filed on Mar. 13, 2020, now Pat. No. 10,891,589.

(Continued)

(51) Int. Cl.
*G06Q 10/08* (2012.01)
*G06Q 30/02* (2012.01)
(Continued)

(52) U.S. Cl.
CPC ........ *G06Q 10/0875* (2013.01); *G05D 1/0088* (2013.01); *G05D 1/0212* (2013.01);
(Continued)

(58) Field of Classification Search
CPC ......... G06Q 10/0875; G06Q 10/06311; G06Q 30/0278; G05D 1/0088; G05D 1/0212;
(Continued)

(56) References Cited

U.S. PATENT DOCUMENTS

2008/0077511 A1   3/2008   Zimmerman
2014/0172553 A1   6/2014   Goulart
(Continued)

OTHER PUBLICATIONS

Information Disclosure Statement filed in U.S. Appl. No. 16/817,972 dated Apr. 16, 2021.

(Continued)

*Primary Examiner* — Marthe Y Marc-Coleman
(74) *Attorney, Agent, or Firm* — Run8 Patent Group, LLC; Peter Miller

(57) ABSTRACT

One variation of a method for deploying fixed cameras within a store includes: dispatching a robotic system to autonomously navigate along a set of inventory structures in the store and generate a spatial map of the store during a scan cycle; generating an accessibility heatmap representing accessibility of regions of the store to the robotic system based on the spatial map; generating a product value heatmap for the store based on locations and sales volumes of products in the store; accessing a number of fixed cameras allocated to the store; generating a composite heatmap for the store based on the accessibility heatmap and the product value heatmap; identifying a subset of inventory structures occupying a set of locations within the store corresponding to critical amplitudes in the composite heatmap; and generating a prompt to install the number of fixed cameras facing the subset of inventory structures in the store.

20 Claims, 6 Drawing Sheets

Related U.S. Application Data

(60) Provisional application No. 62/818,080, filed on Mar. 13, 2019.

(51) Int. Cl.

| | |
|---|---|
| *G06Q 10/06* | (2012.01) |
| *G05D 1/00* | (2006.01) |
| *G05D 1/02* | (2020.01) |
| *G06T 7/73* | (2017.01) |
| *H04N 7/18* | (2006.01) |
| *G06V 10/56* | (2022.01) |
| *G06V 10/60* | (2022.01) |
| *G06V 20/10* | (2022.01) |
| *H02J 7/02* | (2016.01) |

(52) U.S. Cl.
CPC ... *G06Q 10/06311* (2013.01); *G06Q 30/0278* (2013.01); *G06T 7/74* (2017.01); *G06V 10/56* (2022.01); *G06V 10/60* (2022.01); *G06V 20/10* (2022.01); *H04N 7/188* (2013.01); G05D 2201/0216 (2013.01); G06T 2207/10024 (2013.01); *H02J 7/02* (2013.01)

(58) Field of Classification Search
CPC .. G05D 2201/0216; G06T 7/74; G06V 10/56; G06V 20/10; H04N 7/188; H04N 7/181; G07T 2207/10024; H02J 7/02

See application file for complete search history.

(56) References Cited

U.S. PATENT DOCUMENTS

| | | | |
|---|---|---|---|
| 2017/0206669 A1 | 7/2017 | Saleemi et al. | |
| 2017/0225336 A1 | 8/2017 | Deyle et al. | |
| 2017/0286773 A1* | 10/2017 | Skaff | G06V 10/751 |
| 2017/0309136 A1* | 10/2017 | Schoner | G06Q 10/087 |
| 2017/0323376 A1* | 11/2017 | Glaser | G06Q 30/0635 |
| 2018/0150788 A1 | 5/2018 | Vepakomma et al. | |
| 2018/0293543 A1 | 10/2018 | Tiwari et al. | |
| 2019/0043003 A1 | 2/2019 | Fisher et al. | |

OTHER PUBLICATIONS

Information Disclosure Statement filed in U.S. Appl. No. 16/817,972 dated Jun. 30, 2020.
International Search Report received in PCT/US2020/022568 dated Jun. 8, 2020.
Office Action received in U.S. Appl. No. 16/817,972 dated Aug. 10, 2020.
Shelfie Retail. Maximising sales at retail stores with advanced shelf analytics. YouTube. Jan. 8, 2019 (Aug. 1, 2019) [retrieved on May 13, 2020]. Retrieved from internet: < URL: https://www.youtube.com/watch?v=-3VWDKonjkw>. entire video.

* cited by examiner

METHOD FOR DEPLOYING FIXED AND MOBILE SENSORS FOR STOCK KEEPING IN A STORE

CROSS-REFERENCE TO RELATED APPLICATIONS

This Application is a continuation application of U.S. patent application Ser. No. 16/817,972, filed on 13 Mar. 2020, which claims priority to U.S. Provisional Patent Application No. 62/818,080, filed on 13 Mar. 2019, each of which is incorporated in its entirety by this reference.

TECHNICAL FIELD

This invention relates generally to the field of stock keeping and more specifically to a new and useful method for deploying fixed and mobile sensors for stock keeping in a store in the field of stock keeping.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
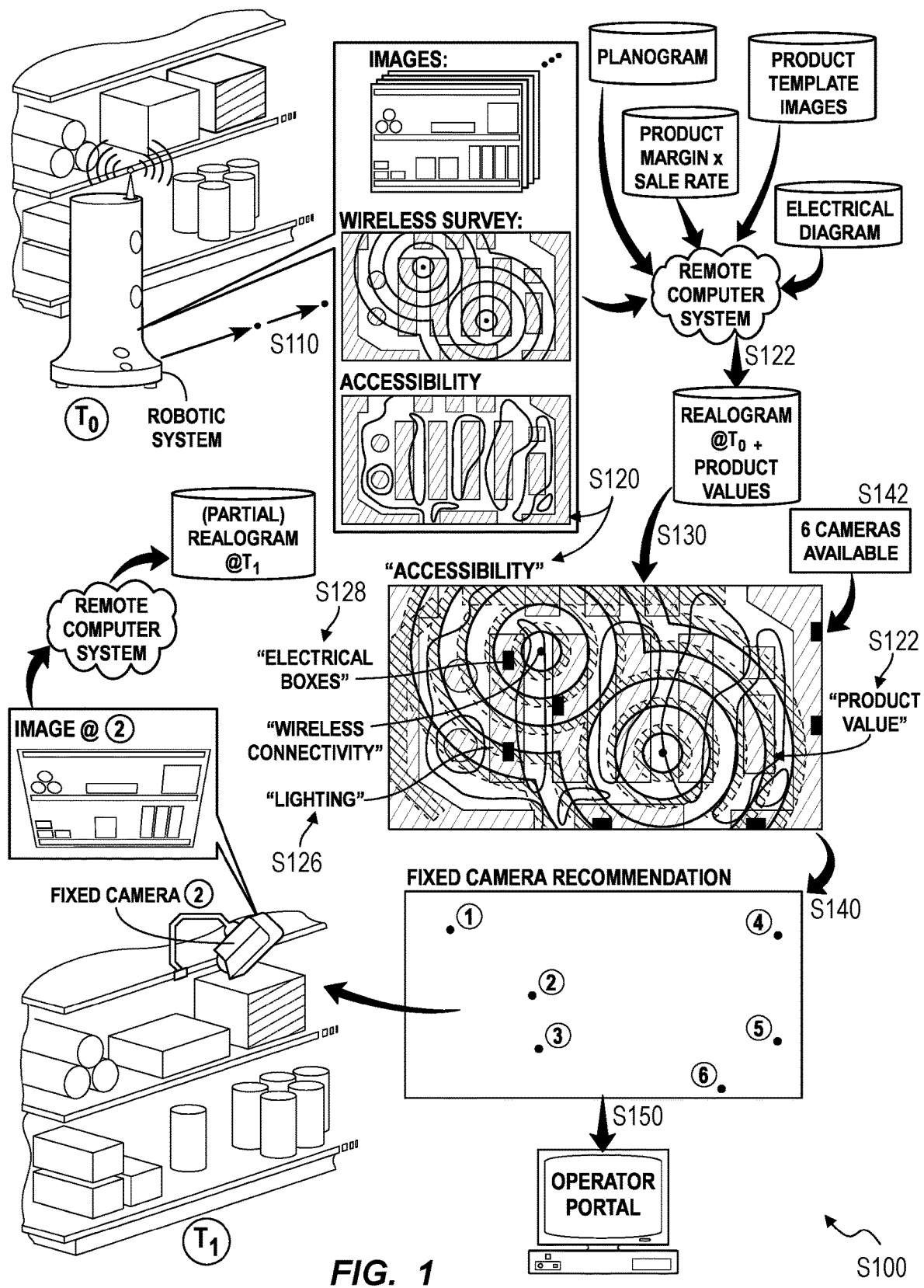
FIG. 1 is a flowchart representation of a method.

As shown in FIG. 1, a method S100 for deploying fixed cameras within a store includes: dispatching a robotic system to autonomously navigate along a set of inventory structures in the store and generate a first spatial map of the store during a first scan cycle in Block S110; generating an accessibility heatmap representing accessibility of regions of the store to the robotic system based on the first spatial map in Block S120; generating a product value heatmap for the store based on locations and sales volumes of products in the store in Block S122; accessing a number of fixed cameras allocated to the store in Block S142; generating a composite heatmap for the store based on the accessibility heatmap and the product value heatmap in Block S130; identifying a first subset of inventory structures, in the set of inventory structures within the store, occupying a first set of locations corresponding to critical amplitudes in the composite heatmap in Block S140, the first subset of inventory structures containing a quantity of inventory structures equal to the number of fixed cameras; and generating a prompt to install the number of fixed cameras facing the first subset of inventory structures in the store in Block S150.

Figure 2:
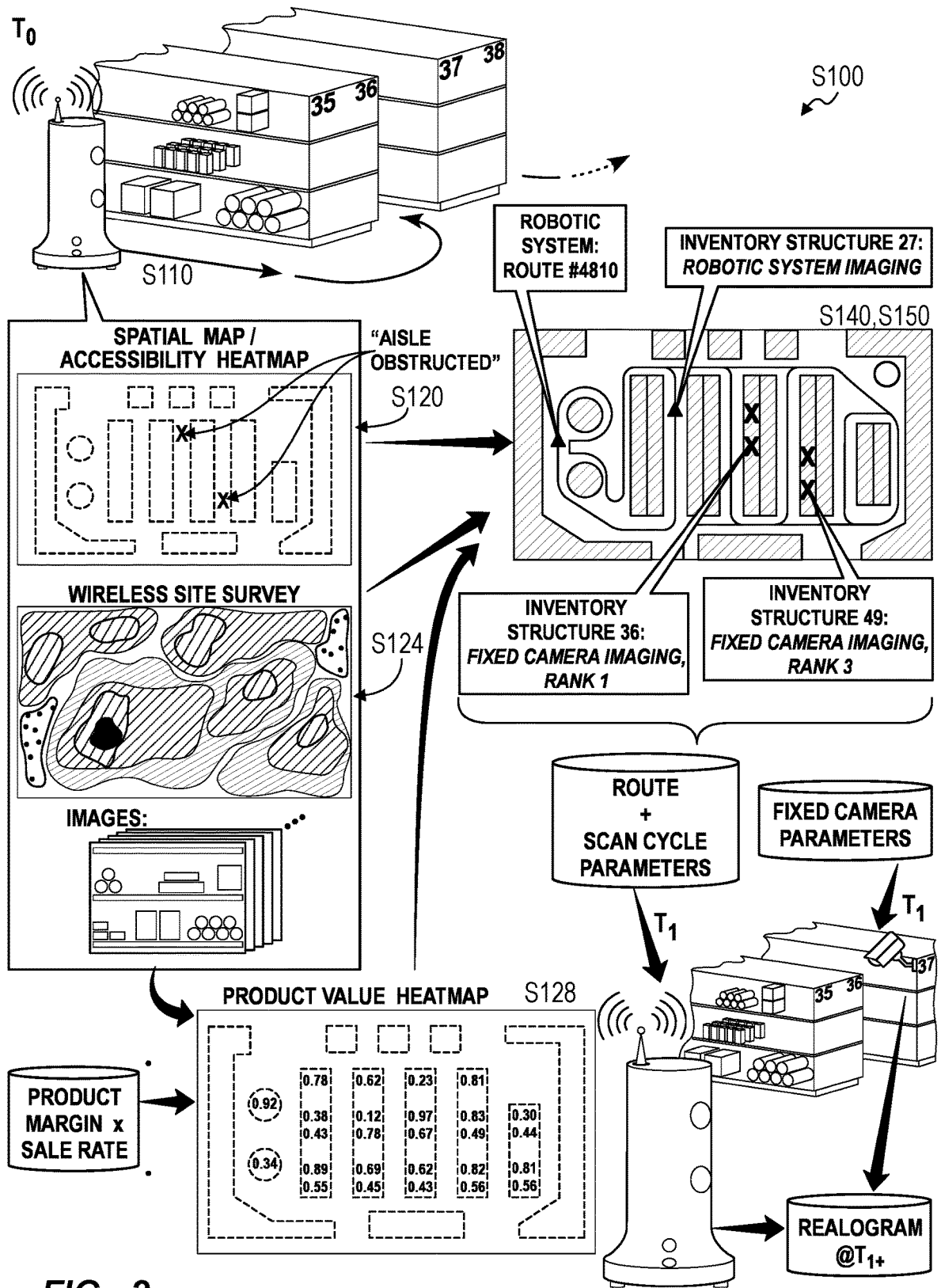
FIG. 2 is a flowchart representation of one variation of the method.

One variation of the method S100 shown in FIG. 2 includes: dispatching a robotic system to autonomously navigate along a set of inventory structures in the store and generate a first spatial map of the store during a first scan cycle in Block S110; generating an accessibility heatmap representing accessibility of regions of the store to the robotic system based on the first spatial map in Block S120; generating a product value heatmap for the store based on locations and sales volumes of products in the store in Block S122; generating a composite heatmap for the store based on the accessibility heatmap and the product value heatmap in Block S130, the composite heatmap including a gradient of amplitudes representing practicality (e.g., value, need, simplicity of installation, and return-on-investment) of fixed cameras to image the set of inventory structures throughout the store; for each inventory structure in the set of inventory structures, calculating a fixed camera score, in a set of fixed camera scores, for imaging the inventory structure with a fixed camera according to an amplitude represented in the composite heatmap at a location corresponding to the inventory structure in Block S140; and prompting prioritization of installation of fixed cameras in the store to image the set of inventory structures according to the set of fixed camera scores in Block S150.

Figure 7:
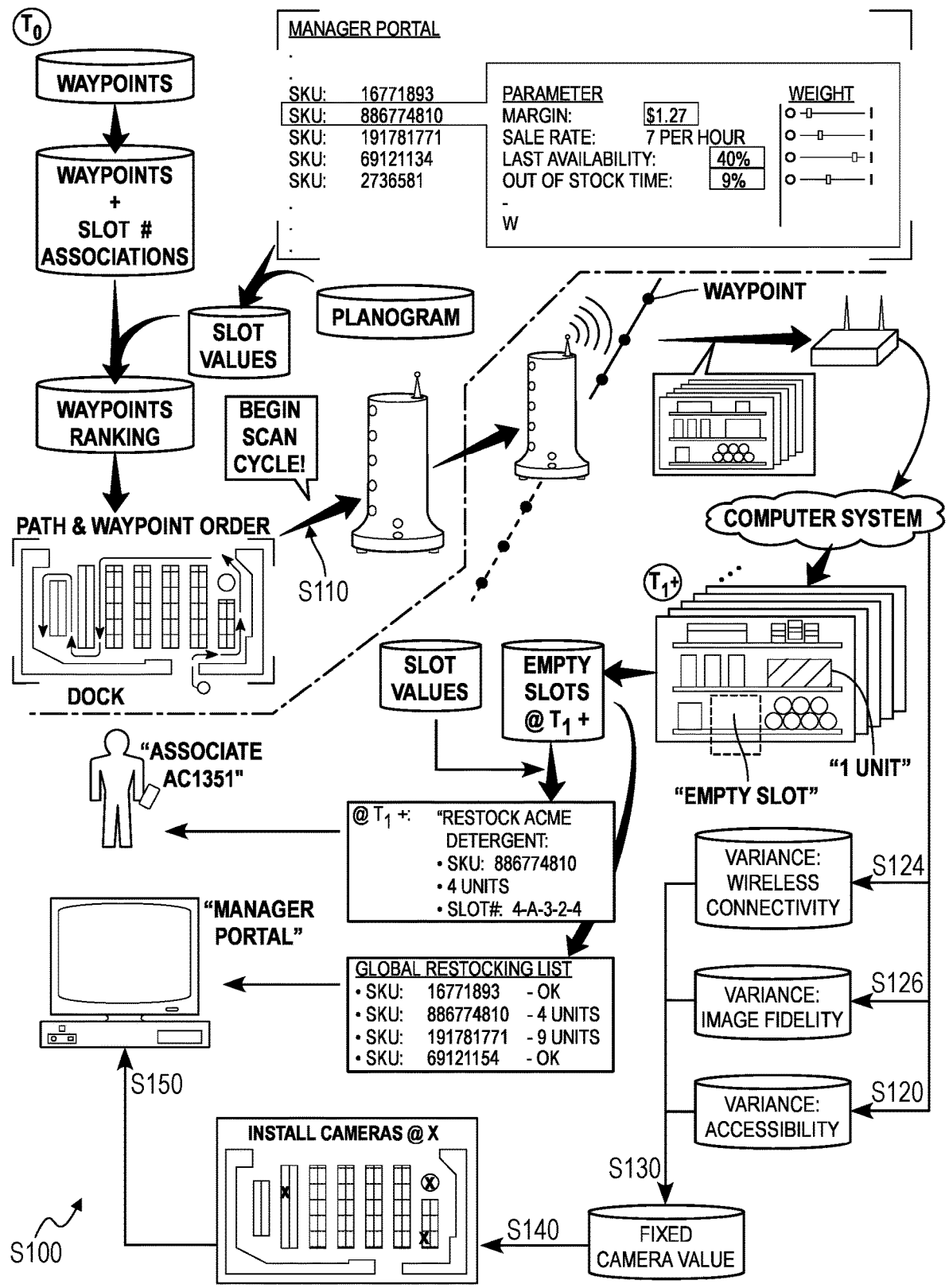
FIG. 7 is a flowchart representation of one variation of the method.

Another variation of the method S100 shown in FIG. 7 includes: accessing a record of locations of a set of products stocked on a set of inventory structures within the store and generating a product value heatmap for the store based on locations and sales volumes of the set of products in Block S122; generating a wireless connectivity heatmap for the store representing wireless network connectivity throughout the store in Block S124; generating a composite heatmap for the store based on the product value heatmap and the wireless connectivity heatmap, the composite heatmap including a gradient of amplitudes representing practicality of fixed cameras to image the set of inventory structures throughout the store in Block S130; for each inventory structure in the set of inventory structures, calculating a fixed camera score, in a set of fixed camera scores, for imaging the inventory structure with a fixed camera according to an amplitude represented in the composite heatmap at a location corresponding to the inventory structure in Block S140; and prompting prioritization of installation of fixed cameras in the store to image the set of inventory structures according to the set of fixed camera scores in Block S150.

2. Applications

Generally, the method S100 can be executed by a remote computer system: to dispatch a mobile robotic system to autonomously navigate within a store and to collect a first set of images depicting products stocked in a first set of inventory structures in the store; to collect a second set of images recorded by a set of fixed cameras facing a second set of inventory structures in the store; to detect and identify products depicted in both the first and second sets of images; and to merge product identities and locations detected in the first and second sets of images into a representation of the stock state of the store, such as in the form of a "realogram" of the store. In particular, the remote computer system can leverage a mobile robotic system (hereinafter the "robotic system") deployed to a store and a set of fixed cameras installed in select, targeted locations in the store to monitor the stock state of the store over time.

For example, a small number of (e.g., twenty) fixed cameras can be installed in targeted locations throughout the store (e.g., a store over 2,000 square feet in size) to capture images of slots, shelves, or shelving segments: that contain high-value products (e.g., high-margin products, high-demand products, products correlated with high patron basket value); that contain products necessitating more-frequent monitoring (e.g., refrigeration units, heated food displays); that are characterized by low accessibility to the robotic system; that are characterized by poor visibility to the robotic system (e.g., a top shelf in a shelving segment, a shelf behind a counter); that fall near high-traffic areas in the store; and/or that are poorly lit. The remote computer system can therefore: access and process images from these fixed sensors in order to track stock state in these slots, shelves, or shelving segments; deploy the robotic system to scan other inventory structures throughout the store; access and process images from the robotic system in order to track stock state in these other inventory structures; fuse these stock states derived from data captured by these fixed cameras and the robotic system into a (more) complete representation of the aggregate stock state of the store; and then generate and distribute individual restocking prompts and/or a global restocking lists to store associates based on this aggregate stock state of the store.

More specifically, the remote computer system can: interface with a small number of fixed cameras installed in a store to access images of a (small) subset of high-value or low-access slots, shelves, or shelving segments in the store; interface with a mobile robotic system to collect images of (many, all) other slots, shelves, or shelving segments in the store; and merge data from both these fixed and mobile systems to autonomously detect and monitor the stock state of the store over time. The remote computer system can then selectively serve restock prompts to associates of the store based on these data, such as in the form of: real-time prompts to restock individual high-value products; and global restocking lists to restock all empty and low-stock slots during scheduled restocking periods at the store. In particular, the remote computer system can: deploy a mobile robotic system to intermittently scan inventory structures throughout the store and return feedback regarding stock state in these inventory structures; and leverage a small set of fixed cameras to monitor targeted slots, shelves, or shelving segments containing high-value products, products necessitating more frequent monitoring, or products that are difficult for the robotic system to access; thereby reducing need for a large number of fixed cameras in the store, increasing efficiency of the robotic system during scan cycles, and ensuring access to higher-frequency and/or higher-fidelity data for targeted products or slots.

Furthermore, the remote computer system can leverage data collected by the robotic system during a scan cycle within the store to automatically identify or predict target locations for deployment of a small number of fixed cameras in the store in order to augment or complete data collected by the robotic system. For example, the remote computer system can dispatch the robotic system to autonomously navigate within the store and to map a store, such as during an initial setup period at the store. The robotic system can then generate a 2D or 3D map of the store and collect images of inventory structures throughout the store and return these data to a remote computer system via a computer network. The remote computer system can then generate a realogram representing a true stock state of the store at the time of the scan cycle and predict highest-value locations for fixed cameras in the store according to this map, such as: locations of shelving segments containing highest frequencies of out-of-stock and low-stock slots as indicated in the realogram; locations of slots in the store designated for highest-value products (e.g., as a function of margin and sale volume); locations inaccessible to the robotic system or characterized by low image fidelity as indicated in the realogram; and/or a wireless connectivity site survey performed automatically by the robotic system during the scan cycle. Accordingly, the remote computer system can prompt an operator, technician, store manager, or store associate, etc. to install a small number of fixed cameras at these recommended locations.

Once these fixed cameras are installed, the remote computer system can: access images recorded by these fixed cameras; detect products and other objects in these images; and compare these detected products and other objects to a planogram of the store, a realogram generated from data collected approximately concurrently by the robotic system, or to a store map generated approximately concurrently by the robotic system to automatically predict the true location and orientation of each of these fixed cameras in the store. Once the remote computer system thus automatically configures these fixed cameras in the store, the remote computer system can systematically collect images from these fixed cameras, deploy the robotic system to execute scan cycles, collect images recorded by the robotic system during these scan cycles, and merge images received from the fixed cameras and the robotic system into a stock state of the store.

Additionally, to reduce wireless connectivity and/or power infrastructure requirements for deployment of fixed cameras in the store, the robotic system can download images from fixed cameras nearby over low-power, short-range wireless communication protocol when the robotic system navigates near these fixed cameras during a scan cycle. Similarly, the remote computer system can broadcast a recharge signal to recharge fixed cameras nearby (e.g., via wireless or inductive charging) when the robotic system navigates near these fixed cameras during a scan cycle. Thus, to enable deployment of fixed cameras in a store without necessitating distribution of wired electrical power sources to each fixed camera location and/or without necessitating Wi-Fi or other high-power, high-bandwidth wireless connectivity at each fixed camera location, the robotic system can: navigate autonomously throughout the store; record images of slots assigned to the robotic system; download images from fixed cameras nearby; and recharge these fixed cameras (e.g., with sufficient charge to record a next sequence of images on an interval until a next robotic system scan cycle), all during one scan cycle.

3. Hierarchy and Terms

A "product facing" is referred to herein as a side of a product (e.g., of a particular SKU or other product identifier) designated for a slot. A "planogram" is referred to herein as a graphical representation of multiple product facings across each of multiple inventory structures within a store (e.g., across an entire store). Product identification, placement, and orientation data recorded visually in a planogram can be also be recorded in a corresponding textual product placement spreadsheet, slot index, or other store database (hereinafter a "product placement database").

A "slot" is referred to herein as a section (or a "bin") of a "produce display" designated for occupation by a set of loose product units, such as the same class, type, and varietal. A produce display can include an open, closed, humidity-controller, temperature-controlled, and/or other type of produce display containing one or more slots on one or more shelves. A "store" is referred to herein as a (static or mobile) facility containing one or more produce displays.

A "product" is referred to herein as a type of loose or packaged good associated with a particular product identifier (e.g., a SKU) and representing a particular class, type, and varietal. A "unit" or "product unit" is referred to herein as an instance of a product—such as one apple, one head of lettuce, or once instance of a cut of meat—associated with one SKU value.

A planogram is described herein as a target stock state of the store, such as in the form of a graphical representation of identifiers and locations assigned to each inventory structure in the store. A realogram is described herein as a representation (or approximation) of the actual stock state of the store, such as in the form of a graphical representation of identifiers of product units and their locations detected on inventory structures based on a last set of images received from the robotic system and/or fixed cameras deployed to the store.

The method S100 is described herein as executed by a computer system (e.g., a remote server, hereinafter a "computer system"). However, the method S100 can be executed by one or more robotic systems placed in a retail space (or store, warehouse, etc.), by a local computer system, or by any other computer system—hereinafter a "system."

Furthermore, the method S100 is described below as executed by the remote computer system to identify products stocked on open shelves on inventory structures within a store. However, the remote computer system can implement similar methods and techniques to identify products stocked in cubbies, in a refrigeration unit, on a hot food (e.g., hotdog) rack, on a wall rack, in a freestanding floor rack, on a table, or on or in any other product organizer in a retail space.

4. Robotic System

A robotic system autonomously navigates throughout a store and records images—such as color (e.g., RGB) images of packaged goods and hyper-spectral images of fresh produce and other perishable goods—continuously or at discrete predefined waypoints throughout the store during a scan cycle. Generally, the robotic system can define a network-enabled mobile robot that can autonomously: traverse a store; capture color and/or hyper-spectral images of inventory structure, shelves, produce displays, etc. within the store; and upload those images to the remote computer system for analysis, as described below.

Figure 4:
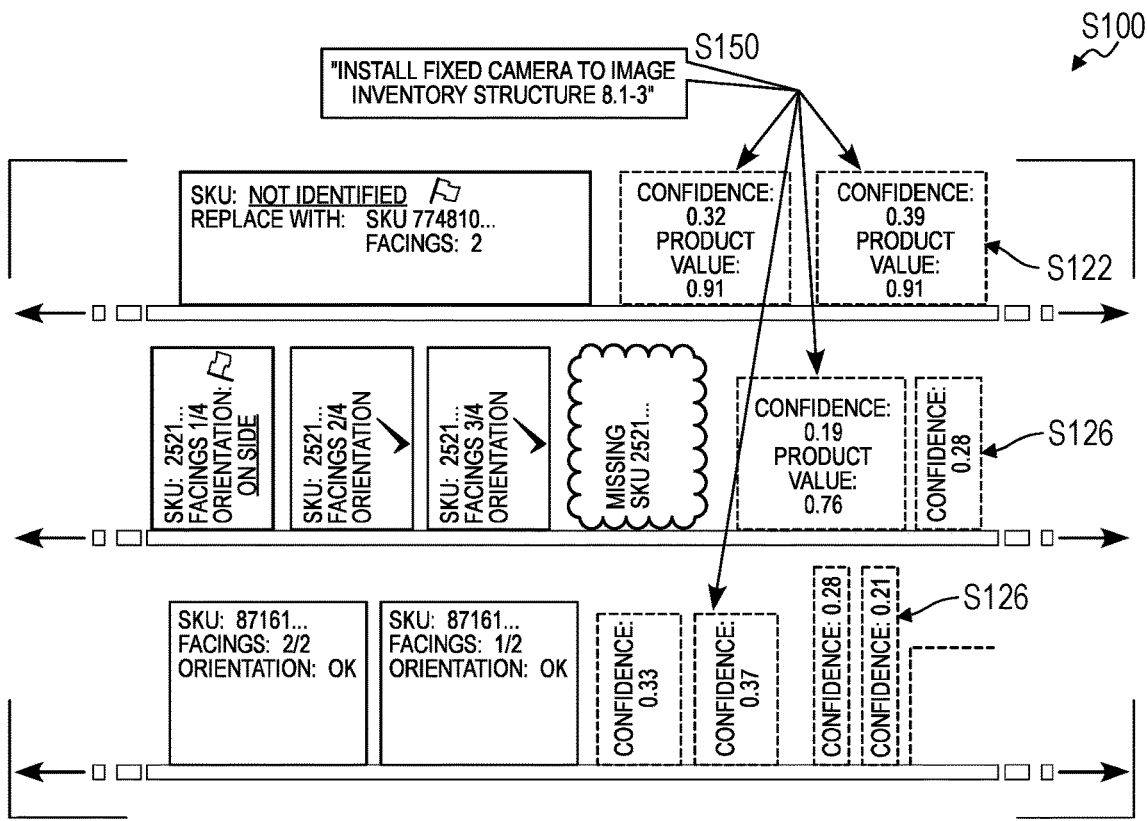
FIG. 4 is a graphical representation of one variation of the method.
Figure 5:
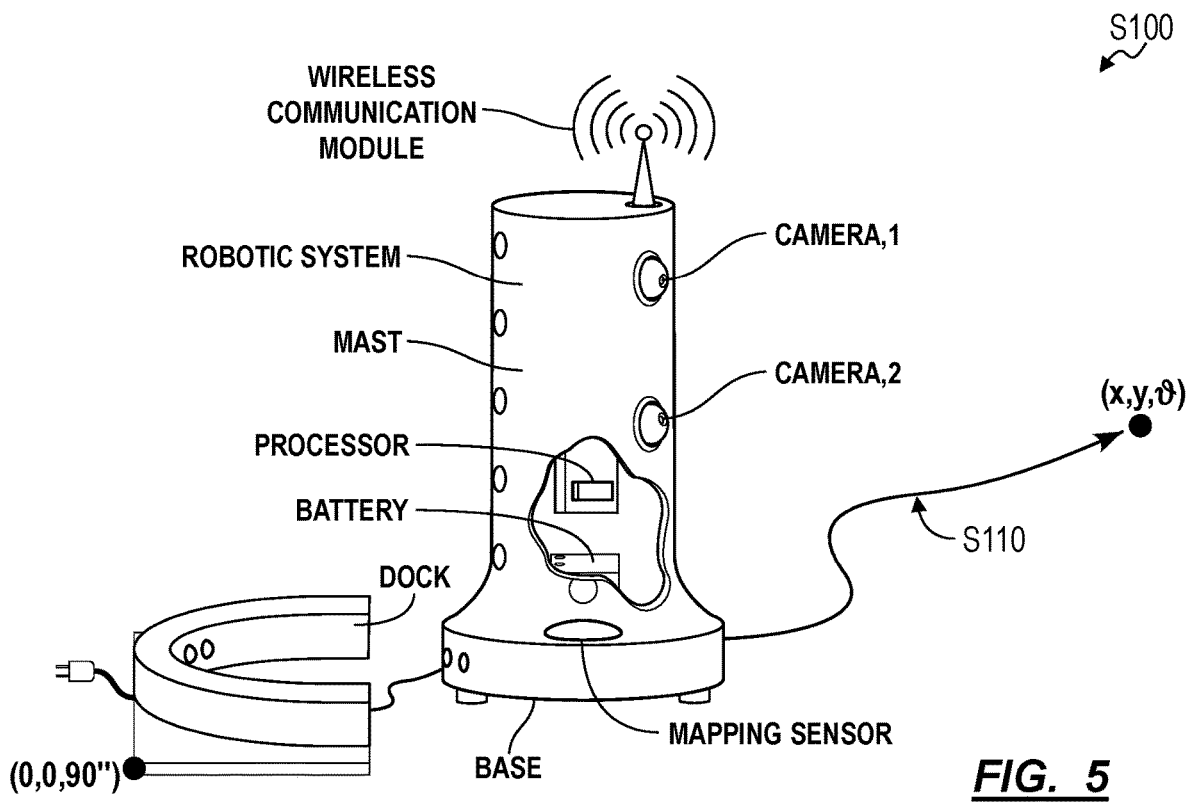
FIG. 5 is a schematic representation of one variation of the method.

In one implementation shown in FIG. 4, the robotic system defines an autonomous imaging vehicle including: a base; a drive system (e.g., a pair of two driven wheels and two swiveling castors) arranged in the base; a power supply (e.g., an electric battery); a set of mapping sensors (e.g., fore and aft scanning LIDAR systems); a processor that transforms data collected by the mapping sensors into two- or three-dimensional maps of a space around the robotic system; a mast extending vertically from the base; a set of color cameras arranged on the mast; one or more hyper-spectral sensors (or "cameras," "imagers") arranged on the mast and configured to record hyper-spectral images representing intensities of electromagnetic radiation within and outside of the visible spectrum; and a wireless communication module that downloads waypoints and a master map of a store from a computer system (e.g., a remote server) and that uploads photographic images captured by the camera and maps generated by the processor to the remote computer system. In this implementation, the robotic system can include cameras and hyper-spectral sensors mounted statically to the mast, such as two vertically offset cameras and hyper-spectral sensors on a left side of the mast and two vertically offset cameras and hyper-spectral sensors on the right side of mast. The robotic system can additionally or alternatively include articulable cameras and hyper-spectral sensors, such as: one camera and hyper-spectral sensor on the left side of the mast and supported by a first vertical scanning actuator; and one camera and hyper-spectral sensor on the right side of the mast and supported by a second vertical scanning actuator. The robotic system can also include a zoom lens, a wide-angle lens, or any other type of lens on each camera and/or hyper-spectral sensor.

In one variation described below, the robotic system further includes a wireless energy/wireless charging subsystem configured to broadcast a signal toward a fixed camera installed in the store in order to recharge this fixed camera. However, the robotic system can define any other form and can include any other subsystems or elements supporting autonomous navigating and image capture throughout a store environment.

Furthermore, multiple robotic systems can be deployed in a single store and can be configured to cooperate to image shelves within the store. For example, two robotic systems can be placed in a large single-floor retail store and can cooperate to collect images of all shelves and produce displays in the store within a threshold period of time (e.g., within one hour). In another example, one robotic system can be placed on each floor of a multi-floor store, and each robotic system can each collect images of shelves and produce displays on its corresponding floor. The remote computer system can then aggregate color and/or hyper-spectral images captured by multiple robotic systems placed in one store to generate a graph, map, table, and/or task list for managing distribution and maintenance of product throughout the store.

5. Fixed Camera

A fixed camera can include: an optical sensor defining a field of view; a motion sensor configured to detect motion in or near the field of view of the optical sensor; a processor configured to extract data from images recorded by the optical sensor; a wireless communication module configured to wirelessly transmit data extracted from images; a battery configured to power the optical sensor, the processor, and the wireless communication module over an extended duration of time (e.g., one year, five years); and a housing configured to contain the optical sensor, the motion sensor, the processor, the wireless communication module, and the battery and configured to mount to a surface within the field of view of the optical sensor intersecting an area of interest within the store (e.g., a shelf below, a shelving segment on an opposite side of an aisle).

The optical sensor can include: a color camera configured to record and output 2D photographic images; and/or a depth camera configured to record and output 2D depth images or 3D point clouds. However, the optical sensor can define any other type of optical sensor and can output visual or optical data in any other format.

The motion sensor can include a passive infrared sensor that defines a field of view that overlaps the field of view of the optical sensor and that passively outputs a signal representing motion within (or near) the field of view of optical sensor. The fixed camera can transition from an inactive state to an active state on a regular interval (e.g., once per hour), on a regular schedule (e.g., proportional to historical patron occupancy in the store), when triggered by the robotic system, and/or responsive to an output from the motion sensor indicating motion in the field of view of the motion sensor. Once in the active state, the fixed camera can trigger the optical sensor to record an image (e.g., a 2D color photographic image), and the wireless communication module can then broadcast this image to a wireless router in the store. Alternatively, the fixed camera can store this image in a local memory (e.g., a buffer), and the wireless communication module can wirelessly transmit images from the buffer to the robotic system when requested by the robotic system during a next scan cycle (e.g., when the robotic system navigates to a location near the fixed camera during this next scan cycle).

The optical sensor, motion sensor, battery, processor, and wireless communication module, etc. can be arranged within a single housing configured to install on an inventory structure—such as by adhering or mechanically fastening to a shelf face or surface within a shelving segment or mounting to an inventory structure via a stalk, as shown in FIG. 1—with the field of view of the optical sensor facing a shelf below, an adjacent slot, or a shelving segment on an opposing side of an aisle in the store, etc.

In one variation described below, the fixed camera includes a wireless energy harvesting and/or a wireless charging subsystem configured to harvest energy from a signal broadcast by the robotic system during a scan cycle (or broadcast by another fixed or mobile transmitter nearby. However, this fixed camera can define any other form and can mount to a surface or inventory structure in any other way.

6. Initial Scan Cycle and Store Survey

During an initial scan cycle when the robotic system is first provisioned to the store, the remote computer system can dispatch the robotic system to autonomously survey the store.

6.1 Spatial Map

Generally, once dispatched to the store, the robotic system can execute an initial scan cycle. During this initial scan cycle, the robotic system can implement simultaneous localization and mapping (or "SLAM") techniques to construct and update a (2D or 3D) spatial map of an unknown environment within the store while also tracking its location within this spatial map based on distance data collected via depth sensors in the robotic system throughout this initial scan cycle, as shown in FIGS. 1 and 2.

For example, a depth sensor in the robotic system can capture depth images representing distances to nearby physical surfaces, and the robotic system can compile these depth images into a spatial map of the store, such as in the form of a 2D or 3D point cloud representing locations of inventory structures, displays, and counters throughout the store. Alternatively, the robotic system can collect raw depth data during this initial scan cycle and upload these data to the remote computer system, such as in real-time or upon conclusion of the initial scan cycle. The remote computer system can then reconstruct a spatial map of the store from these raw depth data. However, the robotic system or the remote computer system can implement any other method or technique to generate a spatial map of the floor space within the store.

6.2 Wireless Site Survey

Concurrently, the autonomous vehicle can test connectivity to a wireless network within the store (e.g., bandwidth, packet loss, latency, throughput, signal strength) and generate a wireless site survey of the store based on wireless network connectivity test results recorded by the robotic system while traversing the store as shown in FIGS. 1 and 2.

More specifically, as the robotic system navigates through the store during this initial scan cycle, the robotic system can also assess performance of one or more wireless networks within the store as a function of location of the robotic system. For example, the robotic system can regularly execute a test routine on an available or selected wireless network (e.g., a wireless ad hoc local area network, a cellular network), such as by broadcasting a test signal to test latency, throughput, packet loss, and/or signal strength via a corresponding network antenna in the robotic system at a frequency of once per second or once per meter traversed by the robotic system. The robotic system can thus characterize latency, throughput, packet loss, signal quality, and/or signal strength of the wireless network over a sequence of discrete test locations occupied by the robotic system during the initial scan cycle in the store. The robotic system can also tag each group of wireless network characteristics captured by the robotic system during this initial scan cycle with a geolocation of the robotic system during the corresponding wireless network test. The robotic system and/or the remote computer system can also aggregate these wireless network characteristics—each tagged with a geolocation referenced to the store—into a wireless site survey, such as in the form of a heatmap containing a visual representation of wireless connectivity characteristics at each test location and interpolated wireless connectivity characteristics between these test locations.

The robotic system can also execute the foregoing process(es) concurrently for each of multiple wireless networks accessible in the store, such as both a wireless ad hoc local area network and a cellular network.

Upon receipt of a wireless site survey from the robotic system, the remote computer system can then generate a wireless connectivity heatmap for the store—based on wireless network connectivity data represented in this wireless site survey captured by the robotic system during the initial scan cycle—in Block S124.

6.3 Inventory Structure Images

In one variation, the robotic system also captures images (e.g., 2D photographic images) and tags each image with the position and orientation of the robotic system—such as relative to the spatial map of the store concurrently generated by the robotic system—at time of image capture. For example, the robotic system can capture images at a frequency of 10 Hz or once per 100 millimeters traversed by the robotic system. The robotic system can then transmit these images to the remote computer system or to a remote database in (near) real-time via one or more wireless networks during the initial scan cycle.

Alternatively, the remote computer system can generate a sequence of waypoints or a route through the store based on existing store data and define imaging parameters along this sequence of waypoints or route, as described below. The robotic system can thus autonomously traverse this sequence of waypoints or route through the store and capture images of inventory structures according to these imaging parameters during the initial scan cycle.

6.4 Lighting Conditions

Similarly, the robotic system can test light intensity, light color, and/or other lighting characteristics while traversing a route through the store. For example, the robotic system can: sample an ambient light sensor integrated into the robotic system, such as at a rate of 1 Hz or once per 100 millimeters of traversed floor distance; store ambient light levels output by the ambient light sensor with concurrent locations of the robotic system when these ambient light levels were captured; and then compile these ambient light levels into a lighting survey for the store.

6.5 RFID Map

The robotic system can also broadcast queries for RFID tags (or other local wireless transmitters) throughout the store and generate a RFID map depicting locations of RFID tags throughout the store based on RFID data (e.g., UUIDs, time-of-flight data) collected by the robotic system while traversing the store.

6.6 Ceiling Map

Furthermore, the robotic system can: include an upward-facing 2D or 3D optical sensor (e.g., a color camera, a stereoscopic camera); and record a sequence of images of the ceiling of the store via this upward-facing optical sensor during this initial scan cycle. The robotic system (or the remote computer system) can also compile (or "stitch") this sequence of images of the ceiling of the store into a 2D or 3D map of the ceiling of the store based on known locations and orientations of the robotic system when each image in this sequence was captured by the robotic system.

6.7 Other Data

However, the robotic system can capture any other data in any other domain during the initial scan cycle, such as: a temperature map representing temperature gradients throughout the store; a humidity map representing humidity gradients throughout the store; a noise map representing noise levels throughout the store; etc.

6.8 Manual Operation

In one variation, a robotic system operator manually navigates the robotic system through the store during the initial scan cycle, such as via an operator portal accessed via a native application or within a web browser executing on the operator's computing device. For example, in this variation, the robotic system operator may send navigational commands and image capture commands to the robotic system. The robotic system can then execute these navigational commands and capture images according to these image capture commands while automatically generating spatial and wireless site surveys of the store, as described above.

However, the robotic system can generate a spatial map, generate a wireless site survey, and/or capture images of inventory structures throughout the store according to any other method or technique. Additionally or alternatively, the robotic system can capture these raw depth and wireless connectivity data, and the remote computer system can compile these data into spatial and wireless site surveys of the store.

6.9 Multiple Scan Cycles

Additionally or alternatively, the remote computer system can dispatch the robotic system to collect the foregoing data over multiple scan cycles. However, the remote computer system and the robotic system can cooperate in any other way to survey the store in various domains—such as inventory structure location, wireless connectivity, color, temperature, lighting, RFID—during one or more scan cycles at the store.

7. Data Offload

Therefore, during the initial scan cycle, the robotic system can: automatically generate a spatial map of physical objects within the store, a wireless site survey, and/or a lighting map; and collect images of inventory structures throughout the store. The robotic system can then return these data to the remote computer system, such as: by streaming these data to the remote computer system in real-time during this initial scan cycle; by intermittently uploading these data to the remote computer system during the initial scan cycle; or by uploading these data to the remote computer system following completion of the initial scan cycle.

8. Inventory Structure Detection

The remote computer system can then identify inventory structures within the store based on data contained in the spatial map. More specifically, upon receipt of the spatial map of the store, photographic images of inventory structures throughout the store, and/or other data captured by the robotic system during the initial scan cycle, the remote computer system can process these data to identify inventory structures and product locations throughout the store.

8.1 Manual Identification

In one implementation, after accessing (or generating) the spatial map of the store thus derived from data captured by the robotic system during the initial scan cycle, the remote computer system can prompt a robotic system operator, the store manager, or a store administrator, etc.: to indicate inventory structures over the spatial map, such as by encircling these inventory structures or by placing virtual boxes over shelving structures, shelving segments, refrigerators, and/or produce displays depicted in the spatial map; and to link these inventory structures represented in the spatial map to inventory structure-specific planograms specifying types and facings of products assigned to each slot in these inventory structures. (Alternatively, the remote computer system can prompt the robotic system operator, the store manager, or the store administrator, etc. to link each inventory structure represented in the spatial map to a corresponding segment of a store-wide planogram that specifies types and facings of products assigned to slots throughout the store.)

8.2 Automatic Identification

Alternatively, the remote computer system can automatically compile the spatial map of the store, a planogram of the store, and/or an architectural plan of the store in order to delineate inventory structures represented in the spatial map.

8.2.1 2 D Spatial map

In one implementation, the robotic system generates and stores a spatial map of the store in the form of a 2D point cloud containing points representing surfaces within a horizontal plane offset above the floor of the store (e.g., two inches above the floor of the store). In this implementation, the remote computer system can implement line extraction techniques to transform the 2D point cloud into a vectorized 2D line map representing real (e.g., dimensionally-accurate) positions and external dimensions of structures arranged on the floor throughout the store. The remote computer system can then implement pattern matching, structure recognition, template matching, and/or other computer vision techniques to identify large, discrete, (approximately) rectilinear regions in the vectorized 2D line map as inventory structures in the store and then label the vectorized line map (hereinafter a "spatial map") accordingly in Block S140.

In one example, the remote computer system can: label a discrete rectangular structure exhibiting a maximum horizontal dimension greater than one meter and exhibiting an aspect ratio greater than 2:1 as an inventory structure; label a discrete rectangular structure exhibiting a maximum horizontal dimension greater than one meter and exhibiting an aspect ratio less than 2:1 as an open table; label a discrete rectangular structure exhibiting a maximum horizontal dimension less than one meter and exhibiting an aspect ratio less than 2:1 as a freestanding popup unit; label a discrete amorphous structure exhibiting a maximum horizontal dimension less than one meter and exhibiting an aspect ratio less than 2:1 as a freestanding floor unit; etc. In another example, the remote computer system can: access a database of standard plan dimensions (e.g., length and width) and geometries (e.g., rectangular) of inventory structures, checkout lanes, refrigeration units, etc. common to retail settings; extract dimensions and geometries of structures on the floor of the space from the 2D line map; and compare these structure dimensions and geometries to standard plan and geometry definitions stored in the database to identify and label select structures represented in the 2D line map as inventory structures.

In another example, the remote computer system can implement edge detection techniques to scan a single horizontal plane in the spatial map for ~90° corners, identify a closed region in the spatial map bounded by a set of four ~90° corners as an inventory structure, and identify an open area between two such inventory structures as an aisle. The remote computer system can then populate the spatial map with labels for inventory structures and aisles accordingly. However, the remote computer system can implement template matching, edge detection, pattern matching, pattern recognition, optical character recognition, color recognition, content-based image retrieval, pose estimation, code reading, shape recognition, and/or any other suitable method or processing technique to identify features in the spatial map and to correlate these features with one or more inventory structures within the store.

8.2.2 3 D Spatial Map

Alternatively, the robotic system can generate and store a spatial map of the store in the form of a 3D point cloud of the store. Upon receipt of this 3D point cloud from the robotic system, the remote computer system can select an horizontal slice of the 3D point cloud offset above (e.g., approximately two inches above) a floor surface represented in the 3D point cloud and then implement similar techniques to transform this plane of points into a vectorized 2D line map representing real positions and external dimensions of structures occupying the floor of the store. The remote computer system can then implement methods and techniques described above to identify all or a subset of these discrete structures as inventory structures and/or other storage elements in the store. For example, the remote computer system can: transform a 3D point cloud received from the robotic system into a vectorized 3D line map representing real positions of inventory structures (and other structures) in the store; identify discrete volumes bounded by lines in the vectorized 3D line; compare dimensions and geometries of these discrete volumes to a database defining dimensions and geometries of standard inventory structures, checkout aisles, refrigeration units, etc. in retail settings; and then label these discrete volumes as inventory structures, checkout aisles, refrigeration units, etc. accordingly. However, the remote computer system can implement any other method or technique to automatically identify and label discrete structures represented in a spatial map of the store (e.g., a 2D or 3D point cloud, vectorized line map, etc.) as inventory structures or other storage elements within the store without a pre-generated floor layout or other pre-generated data.

8.3 Supervised Inventory Structure Detection

In the foregoing implementations, once the remote computer system identifies inventory structures represented in a spatial map of the store, the remote computer system can prompt a human operator (e.g., a robotic system operator, a manager of the store) to confirm inventory structure labels autonomously applied to the spatial map. For example, the remote computer system can serve a visual form of the spatial map to the operator through the operator portal executing on the operator's mobile computing device or desktop computer and render inventory structure labels over the visual form of the spatial map. The operator can then manually review and adjust these inventory structure labels, thereby providing supervision to the remote computer system in identifying inventory structures throughout the store, such as prior to generation of waypoints for an upcoming imaging routine. Alternatively, the remote computer system can transform map data received from the robotic system into a vectorized spatial map (e.g., a vectorized 2D or 3D line map) of the store, identify discrete structures arranged on the floor of the store within the spatial map, and serve this spatial map with discrete structures highlighted within the spatial map to the operator portal. The operator can then manually confirm that structures highlighted in the spatial map represent inventory structures through the operator portal. However, the remote computer system can interface with an human operator through the operator portal in any other way to collect information confirming identification of inventory structures or identifying inventory structures directly in the spatial map of the store.

8.4 Architectural Plan

In another implementation, the remote computer system can: access an architectural plan of the store; align the architectural plan to the 2D line map (or 2D or 3D point cloud, etc.); and project inventory structure labels, addresses, and/or other identifiers from the architectural plan onto the spatial map of the store in order to define and label discrete inventory structures in the spatial map.

In one example, an operator, etc. uploads a digital copy of a 2D architectural plan of the store—such as including positions of walls, inventory structures, columns, doors, etc. within the store—through an operator portal executing within a browser or native application running on a computing device (e.g., a desktop computer). In this example, the remote computer system can then access and vectorize this digital copy of the architectural plan of the store. In another example, the remote computer system can retrieve an existing vectorized architectural plan for the store from the remote database based on an Internet link supplied by the operator, etc. through the operator portal.

The system can then implement template matching, edge detection, pattern matching, pattern recognition, optical character recognition, color recognition, content-based image retrieval, pose estimation, code reading, shape recognition, and/or any other suitable method or processing technique to identify inventory structures—including geometries, locations, and/or addresses of inventory structures—within the (vectorized) architectural plan. The remote computer system can then: implement image alignment techniques to align a distribution of inventory structures detected in the architectural plan to similar features represented in the spatial map (e.g., a 2D spatial map representing surfaces within a horizontal plane offset two inches above the floor of the store); and port boundaries and addresses of inventory structures from the architectural plan onto the spatial map. The remote computer system can also write links to inventory structure-specific planograms from inventory structure addresses defined in the architectural plan onto corresponding inventory structures thus defined in the spatial map of the store.

However, in this implementation, the remote computer system can implement any other method or technique to fuse an existing architectural plan with a spatial map of the store generated by the robotic system during the initial scan cycle in order to generate a spatial representation of locations and geometries of inventory structures throughout the store, each linked to planogram data for the store.

8.4.1 Ante Hoc Inventory Structure Detection

In the foregoing implementation, the remote computer system can also: ingest an existing architectural plan, planogram, map, or other representation or approximation of the store; identify locations of inventory structures throughout the store based on these existing store data; define a sequence of waypoints or a continuous route around these inventory structures throughout the store; tag each waypoint or segment of the route with an address of an adjacent inventory structures; and dispatch the robotic system to autonomously navigate along these waypoints or along this continuous route during an initial scan cycle.

The robotic system can then implement methods and techniques described above to: autonomously navigate throughout the store according to these waypoints or route; automatically generate a map of physical objects within the store, a wireless site survey, and a lighting map of the store, etc.; label inventory structures represented in the spatial map with addresses of inventory structures based on inventory structure addresses stored in the set of waypoints or along the route; record images (e.g., 2D photographic images and/or depth maps) when occupying waypoints or route locations adjacent inventory structures indicated in existing store data; and then return these data to the remote computer system during this initial scan cycle.

Thus, in this implementation, the robotic system can generate a spatial map—pre-labeled with locations and addresses of inventory structures throughout the store—during the initial scan cycle.

However, the remote computer system can implement any other method or technique to transform scan cycle data (or raw map data, a vectorized 2D or 3D line map)—generated by the robotic system during the initial scan cycle—into a spatial map identifying known (or predicted) locations of inventory structures (and/or other storage elements), such as relative to a coordinate system described below.

9. Product Detection

In one variation, the remote computer system processes photographic images captured by the robotic system during the initial scan cycle to identify products occupying inventory structures in the store during this initial scan cycle.

9.1 Existing Planogram

Figure 6:
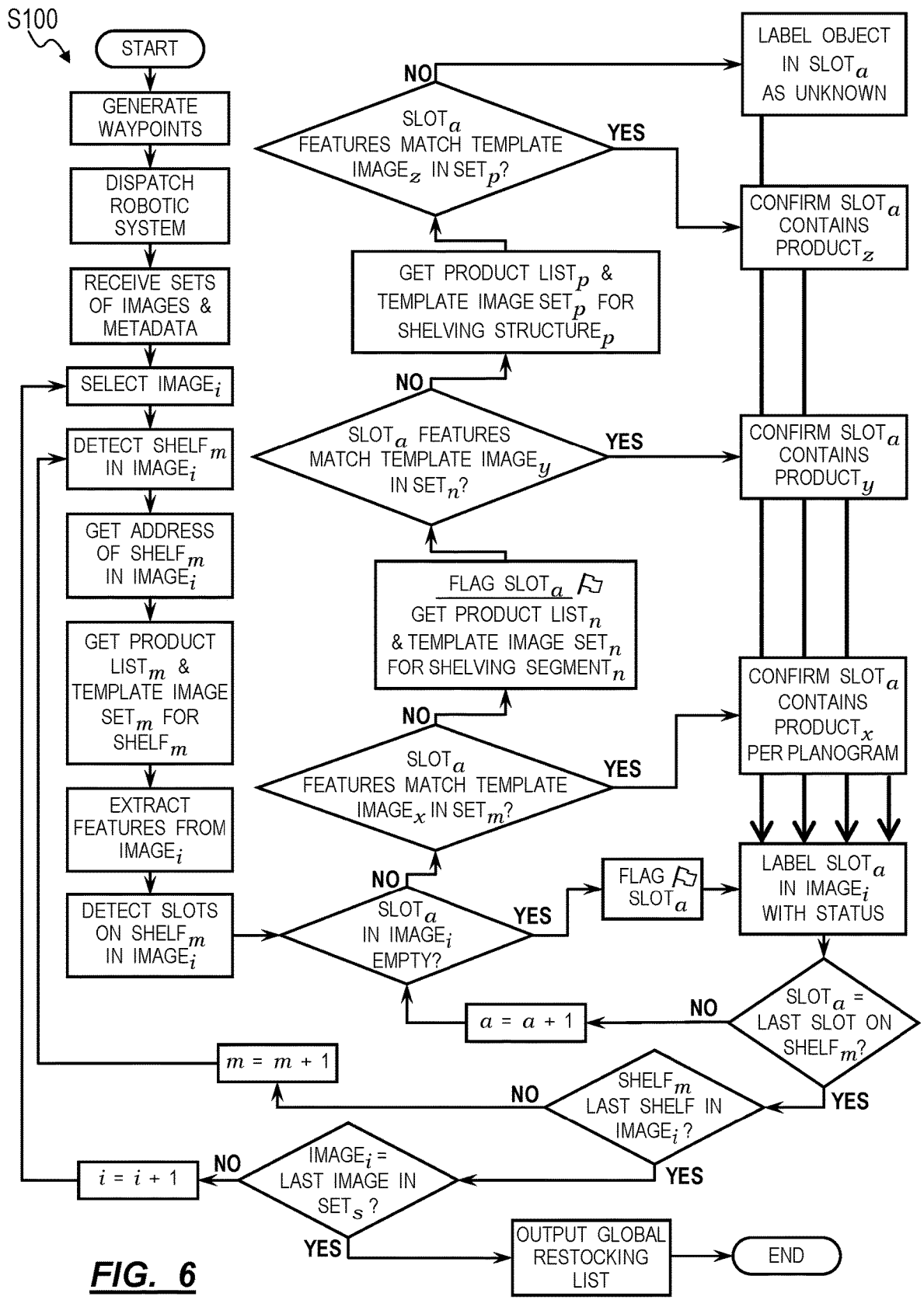
FIG. 6 is a flowchart representation of one variation of the method.

In one implementation as shown in FIGS. 6 and 7, the remote computer system: detects a first shelf in a first inventory structure in a first region of a first photographic image—in the set of photographic images—recorded by the robotic system during the initial scan cycle; identifies an address of the first shelf; retrieves a first list of products assigned to the first shelf by a planogram of the store based on the address of the first shelf; retrieves a first set of template images from a database of template images, wherein each template image in the first set of template images depicts visual features of a product in the first list of products; extracts a first set of features from the first region of the first photographic image; and determines that a unit of the first product is properly stocked on the first shelf based on alignment between features in the first set of features and features in the first template image; or determines that a unit of the first product is improperly stocked on the first shelf in response to deviation between features in the first set of features and features in the first template image. The remote computer system then: associates the first region in the first photographic image with a first slot in an inventory structure represented in a realogram of the store; stores an identifier of the first product in a representation of this first slot in the realogram; and labels this first slot in the realogram with a status (e.g., stocked, improperly stocked) based on whether the first product aligns with the product assigned to this slot by the planogram.

The remote computer system can then repeat this process for each other product and slot depicted in this and other photographic images captured by the robotic system during the initial scan cycle in order to generate a realogram that approximates a stock condition throughout the entire store at the time of the initial scan cycle.

9.2 Absent or Outdated Planogram

In this variation, if a planogram does not currently exist for the store, is not currently available, or is outdated, the remote computer system can compile a distribution of products identified on an inventory structure in the store into an inventory structure-specific planogram that assigns particular products to each slot in this inventory structure. The remote computer system can also: repeat this process to generate an inventory structure-specific planogram for each other inventory structure in the store; present these inventory structure-specific planograms to the store manager, etc.; prompt the store manager, etc. to confirm or modify product assignments in each of these inventory structure-specific planograms; and aggregate these inventory structure-specific planograms into a store-wide planogram for the store.

However, the remote computer system can implement any other method or technique to detect products in images recorded by the robotic system during this initial scan.

10. Image Fidelity Analysis

One variation of the method S100 includes Block S126, which recites initializing an imaging viability heatmap for the store. In particular, for each image in the set of images captured by the robotic system during the initial scan cycle, the remote computer system can: calculate a fidelity score of the image; identify a segment of an inventory structure, in the set of inventory structures in the store, depicted in the image; and represent the fidelity score of the image in a region of an imaging viability heatmap corresponding to a location of the segment of the inventory structure in the store.

Generally, in Block S126, the remote computer system can characterize fidelity of images recorded by the robotic system during the initial scan cycle and predict viability of imaging of inventory structures in the store by the robotic system during future scan cycles based on fidelity of these images.

10.1 Lighting

In one implementation, the remote computer system: characterizes light intensity (or "illumination") and/or lighting consistency of an inventory structure (or of products stocked on the inventory structure) depicted in an image; and assesses a fidelity of the image based on these lighting conditions. For example, the remote computer system can calculate or adjust a fidelity score of the image: proportional to an average light intensity or brightness across the image; and inversely proportional to a variance in light intensity or brightness across the image.

10.2 Product Resolution

In another implementation, the remote computer system: characterizes resolutions of products (or shelves, shelf tags) depicted in an image; and assesses a fidelity of the image based on these resolutions.

In one example, the remote computer system implements methods and techniques described above: to segment an image of an inventory structure into a set of image segments, wherein each image segment depicts one slot on the inventory structure; to detect a product in each image segment; and to identify the product in each image segment. For each product and image segment, the remote computer system can then: extract a pixel boundary of the product, such as in the form of a pixel width and pixel height of the product depicted in this image segment; retrieve a real dimension (e.g., in millimeters) of the product—such as from a database of product dimensions—based on an identity of the product; and calculate a ratio of pixel width to real width of the product (e.g., pixels to millimeters). Generally, a high ratio of pixel width to real width may indicate that the product is depicted at a high resolution, normalized for the size of the product, in the image. Therefore, the remote computer system can interpret a fidelity of this image segment proportional to this ratio. Alternatively, the remote computer system can characterize fidelity of the image based on an absolute pixel width, absolute pixel height, absolute pixel area, and/or absolute quantity of pixels depicting the product in the image segment. The remote computer system can repeat this process for each other product and image segment, calculate an average fidelity of image segments across this image, and calculate or adjust a fidelity score of the entire image based on this average fidelity.

In a similar example, the remote computer system can implement similar methods and techniques to: detect a shelf tag in an image captured by the robotic system during the initial scan cycle; extract a pixel boundary of the shelf tag from the image; retrieve a real dimension (e.g., in millimeters) of the shelf tag; and calculate a ratio of pixel width to real width of the shelf tag. In particular, a high ratio of pixel width to real width may indicate that the shelf tag is depicted at a high resolution, normalized for the size of the shelf tag, in the image. Therefore, the remote computer system can interpret a fidelity of an image segment depicting this shelf tag (or the image more generally) proportional to this ratio. Alternatively, the remote computer system can characterize fidelity of the image or image segment based on an absolute pixel width, absolute pixel height, absolute pixel area, and/or absolute quantity of pixels depicting the shelf tag in the image segment. The remote computer system can repeat this process for each other shelf tag detected in the image, calculate an average fidelity of image segments across this image, and calculate or adjust a fidelity score of the entire image based on this average fidelity.

However, the remote computer system can implement any other method or technique to characterize fidelity of an image based on resolution of product, shelf tags, shelves, shelving segments, or inventory structures more generally depicted in this image.

10.3 Imaging Distance

In a similar implementation, the remote computer system can: estimate a linear or angular distance between the robotic system and an inventory structure depicted in an image captured by the robotic system during the initial scan cycle; and assess a fidelity of the image as a function of (e.g., inversely proportional to) this distance. In particular, at greater linear and/or angular distances from an inventory structure (or from a product on the inventory structure), an image captured by the robotic system may exhibit greater optical distortion and/or may depict a product on the inventory structure at lower resolution. Therefore, the remote computer system can calculate a fidelity for this image: inversely proportional to a linear distance from a camera on the robotic system that recorded the image to the inventory structure (or to a product on the inventory structure); and/or inversely proportional to an angular distance from a focal axis of this camera that recorded the image to a center of the inventory structure (or to a center of a product on the inventory structure).

In one example, the remote computer system: characterizes an illumination intensity of a segment of the inventory structure depicted in an image based on color values in pixels in this image; calculates a location of a mobile camera on the robotic system that captured this image relative to the segment of inventory structure based on a pose of the robotic system within the store when the image robotic system captured the image; characterizes an imaging distance from the mobile camera to slots in the segment of the inventory structure based on the location of the mobile camera relative to the segment of the inventory structure; and characterizes an imaging angle from the mobile camera to slots in the segment of the inventory structure based on the location of the mobile camera relative to the segment of inventory structure. The remote computer system then calculates a fidelity score of the image: proportional to the illumination intensity; inversely proportional to the imaging distance; and inversely proportional to the imaging angle in Block S126.

10.4 Product Identification Confidence Score

In another implementation as shown in FIG. 4, the remote computer system can: calculate a confidence score for identification of each product in an image; and then assess a fidelity of the image as a function of these confidence scores, such as proportional to an average or minimum confidence score for identification of products detected in this image.

In one example, the remote computer system can implement methods and techniques described above to: detect a product in a slot depicted in a segment of an image captured during the initial scan cycle; extract a constellation of features from this image segment; predict an identity (e.g., a SKU value) of this product based on alignment between this constellation of features and known features of products assigned to this slot and nearby slots by the planogram or by adjacent shelf tags detected in the image; and calculate a confidence score for this predicted identity of the product.

In the foregoing example, the remote computer system can: repeat this process to calculate confidence scores for identifying other products detected in this image; and then characterize fidelity of the image (or for segments of the image) based on these confidence scores for product identification of products depicted across the image. In particular, a low confidence for many products depicted in the image may indicate that lighting over an inventory structure depicted in the image, a geometry of the inventory structure, a position of the inventory structure relative to a floor area accessible to the robotic system, or type of products stocked on this inventory structure, etc. renders the inventory structure of low viability for imaging by the robotic system; and vice versa.

10.5 Imaging Viability Heatmap

The remote computer system can then generate an imaging viability heatmap that represents fidelity of images—depicting inventory structures throughout the store—that the robotic system may capture during a scan cycle in the store. More specifically, the remote computer system can compile the foregoing fidelity characterizations of images captured by the robotic system during the initial scan cycle into an imaging viability heatmap that represents viability of product identification on inventory structures depicted in images captured by the robotic system during future scan cycles.

For example, the remote computer system can calculate a high fidelity score for an image: in which bright, consistent lighting is detected across the width and height of the image; in which high confidence scores are calculated for detection and identification of products depicted in this image; in which products detected in the image are depicted at high resolution (e.g., at a high ratio of pixel width to real width); and/or in which products detected in the image fall at short linear distances and/or shallow angular distances from a camera on the robotic system that captured this image. Thus, in this example, the inventory structure depicted in this high-fidelity image may be viable for future imaging by the robotic system.

Conversely, the remote computer system can calculate a low fidelity score for an image: in which low, inconsistent, or vignette lighting is detected across the image; in which low confidence scores are calculated for detection and identification of products depicted in this image; in which products detected in the image are depicted at low resolution (e.g., at a low ratio of pixel width to real width); and/or in which products detected in the image fall at long linear distances and/or high angular distances from the camera on the robotic system that captured this image. Thus, in this example, the inventory structure depicted in this low-fidelity image may not be viable (or may be less viable) for future imaging by the robotic system, and fixed cameras facing this inventory structure may yield better detection and identification results for products depicted in images of this inventory structure.

More generally, high-fidelity images of inventory structures—such as images depicting well-illuminated products, images of inventory structures recorded at close range, and/or images in which product identification confidence is high) recorded by the robotic system during this initial scan cycle may indicate that the robotic system is suitable for capturing high-fidelity images of these inventory structures in the future. However, low-fidelity images of inventory structures (e.g., images depicting poorly-illuminated inventory structure, images of inventory structures recorded at long range, and/or images in which product identification confidence is low) recorded by the robotic system during this initial scan cycle may indicate that a fixed camera is better suited to imaging these inventory structure in the future.

In one implementation, the remote computer system: selects a first image captured by the robotic system during the initial scan cycle; locates a field of view of a camera on the robotic system that captured this image within the spatial map of the store based on known intrinsic properties of the camera and a known position and orientation (or "pose") of the robotic system when this image was captured; identifies a segment of an inventory structure(s) that intersects this field of view of the camera; and projects a fidelity score of this image onto this segment of the inventory structure(s) in the 2D spatial map of the store. The remote computer system then repeats the process for each other image captured during the initial scan cycle to annotate the spatial map of the store with viabilities of imaging inventory structures with the robotic system. The remote computer system can store this annotated spatial map as an "imaging viability heatmap" for the store.

Furthermore, in the foregoing implementation, the remote computer system can implement similar methods and techniques to project fidelity scores of image segments (e.g., image segments depicting individual slots or shelves) onto inventory structures represented in the spatial map rather than project aggregate fidelity scores for entire images onto corresponding inventory structure segments depicted in the spatial map of the store.

However, the remote computer system can characterize viability of imaging inventory structures throughout the store in any other way based on fidelities or other qualities of images captured by the robotic system during the initial scan cycle.

11. Robotic System Accessibility Heatmap

Block S120 of the method S100 recites generating an accessibility heatmap representing accessibility of regions of the store to the robotic system based on the first spatial map. Generally, in Block S120, the remote computer system can assess accessibility of regions in the store to the robotic system based on features represented in the spatial map generated during the initial scan cycle, as shown in FIGS. 1 and 2.

In one implementation, the remote computer system assesses accessibility of discrete inventory structures throughout the store—such as individual shelving segments—and compiles accessibility of these discrete inventory structures into an accessibility heatmap for the store. For example, inventory structures facing a wider aisle may be more easily and consistently accessed (e.g., less likely to be obstructed by traffic, temporary product displays, etc.) for imaging by the robotic system during future scan cycles than inventory structures facing a narrower aisle. Therefore, the remote computer system can: identify an aisle between a pair of neighboring inventory structures in the spatial map (or architectural plan, etc.) of the store; extract a width of this aisle from the spatial map of the store; and calculate an accessibility score for shelving segments in these neighboring inventory structures as a function of (e.g., proportional to) the width of this aisle.

Similarly, more obstructions in an aisle may reduce accessibility of the robotic system to shelving segments in this aisle. Therefore, the remote computer system can: select a shelving segment in an aisle depicted in the spatial map (or the architectural plan) of the store; interpolate a continuous linear boundary on each side of the aisle in the spatial map; detect obstructive objects or surfaces depicted in the spatial map between these continuous linear boundaries and between the shelving segment and an open end of the aisle; characterize restriction of the aisle between the open end of the aisle of the shelving segment based on (e.g., inversely proportional to) widths and/or lengths of these obstructive objects; and calculate or adjust an accessibility score of the shelving segment inversely proportional to restriction of the aisle between the open end of the aisle the shelving segment.

Furthermore, a shelving segment near an open end of an aisle may be more easily accessed by the robotic system than a shelving segment near a center or a closed end of an aisle. Therefore, the remote computer system can: identify a shelving segment in the spatial map (or the architectural plan) of the store; extract a distance—from this shelving segment to an open end of an aisle containing this shelving segment—from the spatial map; and then calculate or adjust an accessibility score of this shelving segment proportional to this distance.

The remote computer system can repeat this process for each other shelving segment throughout the store. The remote computer system can then compile these accessibility scores for shelving segments throughout the store into an accessibility heatmap—that represents accessibility of each of these shelving segments in the store—based on known locations of these shelving segments throughout the store.

12. Electrical Infrastructure Heatmap

One variation of the method S100 includes Block S128, which recites generating an electrical infrastructure heatmap representing proximity to fixed electrical infrastructure in the store based on a map of electrical infrastructure in the store. Generally, in Block S128, the remote computer system can generate an electrical infrastructure heatmap for the store, which represents proximity of locations throughout the store to existing electrical infrastructure.

In one example in which the robotic system records a sequence of ceiling images during the initial scan cycle, the remote computer system can assemble (or "stitch") these ceiling images into a contiguous 2D or 3D representation of the ceiling of the store. The remote computer system can then: implement template matching, artificial intelligence, and/or other computer vision techniques to detect electrical conduit and electrical outlets in this representation of the ceiling of the store; and aggregate locations of detected electrical conduit and electrical outlets into a map of electrical infrastructure in the store.

In another example, the remote computer system schedules the robotic system to capture a sequence of images of a ceiling of the store while autonomously navigating through the store during the initial scan cycle. The remote computer system then: assembles this sequence of images into a composite image of the ceiling of the store; implements computer vision and/or artificial intelligence techniques to detect electrical conduit and electrical outlets in the composite image of the ceiling of the store; and aggregates locations of electrical conduit and electrical outlets thus detected in the composite image of the ceiling of the store into the map of electrical infrastructure in the store.

Alternatively, the remote computer system can access an existing electrical plan of the store, such as uploaded by an operator, store manager, etc. via the operator portal.

The remote computer system can then: calculate electrical accessibility scores for discrete locations (e.g., one-meter-square areas) throughout the store proportional to proximity to electrical outlets (e.g., weighted by a first magnitude) and proportional to proximity to electrical conduit (e.g., weighted by a second magnitude less than first magnitude to account for electrical access with installation of addition electrical outlets); and compile these electrical accessibility scores into an electrical accessibility heatmap for the store.

13. Product Value Heatmap

Block S122 of the method S100 recites generating a product value heatmap for the store based on locations and sales volumes of products in the store. Generally, in Block S122, the remote computer system can generate a "product value heatmap" that represents values of slots in inventory structures throughout the store, as shown in FIGURES and 4.

In one implementation, the remote computer system: accesses sales data for products sold at the store, such as from a point-of-sale system; accesses margins of these products; calculates "values" of these products as a function of (e.g., a product of) sale rate and margin; annotates each slot defined in the planogram with a value of the product designated for the slot; aligns the planogram to the spatial map of the store; projects product values from slots defined in the planogram onto inventory structures depicted in the spatial map; and stores this annotated spatial map as a product value heatmap for the store.

However, in the foregoing implementation, the remote computer system can calculate a value of a product based on any other characteristics of the product or historical sale data of the product.

14. Frequency Monitoring Heatmap

The remote computer system can also generate a "frequency monitoring heatmap" depicting monitoring need for products throughout the store.

In one implementation, the remote computer system accesses sales data for products sold at the store, such as from a point-of-sale system, and derives sale frequency (e.g., quantity of units sold per day) for these products. Then, for a first slot represented in the planogram of the store, the remote computer system: reads a quantity of units of a particular product assigned to the slot by the planogram; retrieves a total quantity of units of the particular product assigned to all slots in the store; divides the quantity of units of the particular product assigned to the slot by the planogram by the total quantity of units of the particular product assigned to all slots in the store to calculate a normalized quantity of units of the particular product assigned to the slot; divides the sale frequency (e.g., ten units per day) of the particular product by the normalized quantity of units of the particular product assigned to the slot (e.g., five units) to calculate a frequency monitoring value for the slot; and annotates the slot defined in the planogram with this frequency monitoring value. The remote computer system then: repeats this process for each other slot defined in the planogram; aligns the planogram to the spatial map of the store; projects frequency monitoring values from slots defined in the planogram onto inventory structures depicted in the spatial map; and stores this annotated spatial map as a frequency monitoring heatmap for the store.

In another implementation, the remote computer system can retrieve predefined monitoring frequency specifications for products stocked in the store, such as: higher monitoring frequencies for heated and/or refrigerated products that exhibit greater sensitivities to temperature and temperature variations; and lower monitoring frequencies for dry goods that exhibit lower sensitivities to temperature and temperature variations. The remote computer system can then: write these predefined monitoring frequency specifications to slots assigned corresponding products in the planogram; align the planogram to the spatial map of the store; project these monitoring frequency from slots defined in the planogram onto inventory structures depicted in the spatial map; and store this annotated spatial map as a frequency monitoring heatmap for the store.

However, the remote computer system can calculate a frequency monitoring heatmap for slots and products throughout the store based on any other historical sales data or characteristics of these products.

15. Lighting Heatmap

The remote computer system can also generate a lighting heatmap that represents quality of effective illumination of inventory structure in the store.

In the variation described above in which the robotic system samples ambient light levels throughout the store during the initial scan cycle. The remote computer system can: retrieve a set of light level measurements and locations captured by the robotic system during the initial scan cycle (or a lighting survey generated by the robotic system more generally); transfer these geo-referenced light level measurements onto the spatial map of the store; and interpolate lighting conditions along faces of inventory structures—depicted in the spatial map—based on these geo-referenced light level measurements. The remote computer system can additionally or alternatively project light intensity (or illumination) characteristics—extracted from images of inventory structures captured during the initial scan cycle—onto these inventory structures depicted in the spatial map. The remote computer system can then store this annotated spatial map as a lighting heatmap that represents illumination of inventory structures throughout the store.

16. Fixed Sensor Planning

The remote computer system can then predict, identify, rank, and/or prioritize locations for deployment of fixed cameras to the store in order to augment stock keeping by the robotic system based on data collected by the robotic system during the initial scan cycle.

16.1 Layer Fusion

In one implementation as shown in FIG. 1, the remote computer system aligns the heatmaps described above—such as wireless connectivity, image fidelity, accessibility, electrical access, product value, frequency monitoring, and/or lighting heatmaps—into a composite heatmap representing need for imaging by fixed camera (and simplicity of installation of fixed cameras). The remote controller then: identifies a set of highest-scoring (or "highest-intensity") inventory structures in this composite heatmap; fuses these highest-scoring regions in this composite heatmap with the spatial map of the store or a planogram of the store to identify a subset of inventory structures (or slots, shelving segments) to image with fixed cameras; and generates a (ranked) list of fixed cameras locations facing this subset of inventory structures.

In particular, in this implementation, the remote computer system can spatially align the wireless connectivity, image fidelity, accessibility, electrical access, product value, frequency monitoring, and/or lighting heatmaps (or "layers"); assign weights (or "fusion coefficients") to these heatmaps, such as based on types of fixed cameras allocated to the store and whether the robotic system will continue to operate in the store after installation of fixed cameras; and then fuse these heatmaps—according to their weights—into a "composite heatmap."

For example, for deployment of battery-operated, wirelessly-charged, or wirelessly-powered fixed cameras configured to broadcast images over a wireless network, the remote computer system can assign weights (or "fusion coefficients") to these heatmaps, including: a highest negative weight (e.g., −1.0) to the accessibility heatmap to reflect priority for fixed cameras to image inventory structures exhibiting low accessibility for the robotic system; a second-highest weight (e.g., +0.8) to the product value and/or frequency monitoring heatmaps to reflect priority for imaging inventory structures stocked with high-value or high-sale-rate products with fixed cameras; a third-highest weight (e.g., +0.6) to the wireless connectivity heatmap to reflect a priority for limiting modification to an in-store wireless network to support deployment of fixed cameras; a fourth-highest negative weight (e.g., −0.4) to the imaging viability heatmap to reflect priority for fixed cameras to image inventory structures that yield low-fidelity images when imaged by the robotic system; and/or a lowest weight (e.g., null) to the electrical infrastructure heatmap to reflect absence of need for fixed electrical infrastructure to power fixed cameras in the store.

In another example, for deployment of wired fixed cameras powered by fixed electrical infrastructure, the remote computer system can assign weights to these heatmaps, including: a highest weight (e.g., 1.0) to the product value and/or frequency monitoring heatmap; a second highest weight (e.g., 0.9) to the electrical infrastructure heatmap to reflect priority for limiting modification to electrical infrastructure in the store to support deployment of fixed cameras; a third-highest negative weight (e.g., −0.7) to the accessibility heatmap; and a lowest weight (e.g., −0.5) to the imaging viability heatmap.

More specifically, for fixed cameras configured to broadcast images directly to a fixed gateway or wireless router, the remote computer system can assign a relatively high weight to the wireless connectivity layer; and vice versa. Similarly, for fixed cameras requiring an external power source, the remote computer system can assign a relatively high weight to the electrical accessibility layer; and vice versa.

The remote computer system can then: aggregate these heatmaps—according to their assigned weights—into a composite heatmap of the store; project boundaries of inventory structures from the spatial map of the store (or from an architectural plan of the store) onto the composite heatmap; and filter the composite heatmap to include values that intersect these inventory structures (e.g., fall within the 3D volumes of these inventory structures; fall within the 2D floor plans of these inventory structures; intersect the outer 2D faces of 3D volumes of these inventory structure; or intersect 1D faces of the 2D floor plans of these inventory structures). This bounded composite heatmap may define a gradient of "composite imaging values" across the store. Each composite imaging value in this gradient can therefore represent: a value of installing a fixed camera to image a corresponding segment of an inventory structure to the store; an ease of installation of a fixed camera to image this inventory structure segment (e.g., an inverse of necessity to extend wireless network connectivity or electrical infrastructure); and/or an improvement in accuracy or confidence in tracking a stock condition of this inventory structure segment. More specifically, a composite imaging value contained in a pixel (or other region) of the composite heatmap can represent a value of a fixed camera to imaging a slot, shelving segment, or inventory structure that occupies a location in the store corresponding to this pixel or region in the composite heatmap.

16.2 Fixed Sensor Location

The remote computer system can then: identify a set of clusters containing highest (average, aggregate) composite imaging values (or "critical amplitudes") in the composite heatmap; identify segments of inventory structures in the store that correspond to these clusters; and calculate a set of fixed camera locations and orientations that locate these inventory structure segments in fields of view of these fixed cameras.

More specifically, because a first slot (or first shelving segment, or other inventory structure) with a low composite imaging value (e.g., a non-critical amplitudes; an amplitude below a critical amplitude) is characterized by a combination of relatively high accessibility by the robotic system, relatively high image fidelity for images captured by the robotic system, relatively high-quality lighting conditions, relatively low product value, and/or relatively poor access to fixed electrical infrastructure, this first slot (or first shelving segment, or other inventory structure) may be characterized by low practicality (e.g., low value, low need, high complexity of installation, and/or low return-on-investment) for imaging by a fixed and may therefore remain a proper candidate for imaging by the robotic system. However, because a second slot (or second shelving segment, or other inventory structure) with a high composite imaging value is characterized by a combination of relatively low accessibility by the robotic system, relatively low image fidelity for images captured by the robotic system, relatively low-quality lighting conditions, relatively high product value, and/or relatively high access to fixed electrical infrastructure, this second slot (or shelving segment, or other inventory structure) may be characterized by high practicality (e.g., high value, high need, high simplicity of installation, and/or high return-on-investment) for imaging by a fixed and may and may therefore present as a better candidate for imaging by a fixed camera.

In one implementation, the remote computer system: identifies a set of target regions in the composite heatmap associated with composite imaging values exceeding a threshold score; generates a list of fixed camera locations and orientations that locates these target regions in fields of view of a set of fixed cameras; and serves a prompt to the operator, store manager, etc.—such as through the operator portal described above—to install a set of fixed cameras in these locations and orientations in to order to image slots, shelving segments, or other inventory structures in the store that correspond to these target regions in the composite heatmap.

In another implementation, the remote computer system prompts the operator or technician to indicate a quantity of fixed cameras available for installation in the store, such as through the operator portal. The remote computer system then identifies a set of target regions—equal to this quantity of fixed cameras—in the composite heatmap that exhibit greatest (average or aggregate) composite imaging values (i.e., "critical amplitudes"). For example, the remote computer system can detect individual pixels (or clusters of pixels)—within inventory structure boundaries projected from the spatial map or heatmap onto the composite heatmap—that exhibit greater composite imaging values (or average composite imaging values, composite imaging value sums, "critical amplitudes") within the composite heatmap. The remote computer system can then: transfer locations of these individual pixels (or clusters of pixels) onto the spatial map to define a set of fixed camera locations; annotate these projected regions in the spatial map with prompts to install fixed cameras in these locations; and return this annotated spatial map to the operator, etc.

In the foregoing implementations, the remote computer system can identify possible camera mounting locations throughout the store and identify fixed camera locations accordingly. For example, the remote computer system can extract a 2D or 3D representation of possible camera mounting locations from the spatial map of the store, such as: faces of shelves in inventory structures; and a ceiling surface throughout the store. The computer system can also retrieve intrinsic properties of a fixed camera allocated to or designated for the store, such as angle of view, fixed zoom level or zoom range, and resolution. The robotic system can then: select a first camera location from the representation of possible camera mounting locations in the store; pair this first location with a first orientation; calculate a field of view of a fixed camera at this first location and first orientation; project this field of view onto the composite heatmap; and calculate a sum of composite imaging values intersecting this field of view projected onto the composite heatmap. The remote computer system can repeat this process for a range of orientations at this first location to calculate sums of composite imaging values intersecting fields of view of a fixed camera at these combinations of the first location and range of orientations. The remote computer system can further repeat this process for other possible camera locations and orientations defined in the representation of possible camera mounting locations in the store.

The remote computer system can then: identify a subset of fixed camera location and orientation pairs that yield fields of view that intersect the highest composite imaging value sums; populate the spatial map of the store with prompts to install cameras at these camera locations and orientations (or otherwise generate instructions to install cameras at these camera locations and orientations); and present this annotated spatial map (and/or these instructions) to the operator, store manager, etc.

In a similar example, the remote computer system: detects faces of shelves in the set of inventory structures in the first spatial map; and represents a set of camera mounting locations in a camera mount map for the store based on locations of faces of shelves in the set of inventory structures extracted from the first spatial map. For each camera mounting location in the set of camera mounting locations, the remote computer system: selects a first camera location from the camera mount map; calculates a field of view of a fixed camera located at the first location based on properties of the fixed camera; projects the field of view of the fixed camera onto the composite heatmap; and calculates a sum of amplitudes, in the composite heatmap, intersecting the field of view of the fixed camera projected onto the composite heatmap. The remote computer system then: identifies a subset of fixed camera locations—in the camera mount map—that yield fields of view that intersect highest sums of amplitudes (e.g., highest composite imaging value sums) in the composite heatmap; generates a prompt to install the number of fixed cameras in the subset of fixed camera locations; and serves this prompt to the operator, store manager, etc. such as in the form of annotated spatial map or camera mount map via the operator portal.

The remote computer system can additionally or alternatively rank these fixed camera location and orientation pairs according to their corresponding composite imaging value sums; present this ranked list of location and orientation pairs to the operator, store manager, etc.; and prompt the operator, store manager, etc. to install fixed cameras in the store at particular locations and orientations according to a priority indicated by this ranked list.

For example, for a first inventory structure in the set of inventory structures in the store, the remote computer system can calculate a first fixed camera score for imaging the first inventory structure with a fixed camera according to a composite imaging value (or a composite imaging value sum, an "amplitude") represented in the composite heatmap at a location corresponding to the known location of the first inventory structure. The remote computer system can repeat this process to calculate a fixed camera score for each other inventory structure in the store. The remote computer system can then prompt prioritization of installation of fixed cameras in the store—to image the set of inventory structures—according to these fixed camera scores, such as by: generating a list of inventory structures (or corresponding fixed camera locations) ranked by fixed camera score; and then presenting this ranked list of inventory structures to the operator, store manager, etc. via the operator portal.

However, the remote computer system can compile survey data collected by the robotic system and/or other existing data for the store in any other way to isolate a subset of slots, shelves, shelving segments, or other inventory structures particularly suited for monitoring with fixed cameras.

17. Fixed Camera Refinement

In one variation, the remote computer system interfaces with the robotic system to execute multiple scan cycles over time, including generating new maps of the store, collecting additional images of inventory structures throughout the store, and surveying the store in various other domains. For each of these scan cycles, the remote computer system can: access these scan cycle data from the robotic system; detect and identify products in these images; characterize fidelity of these images; generate a set of heatmaps (or "layers") georeferenced to the map of the store; and recalculate composite imaging values for slots (or shelves, shelving segments) throughout the store. The remote computer system can then combine these composite imaging values over time and recommend installation of fixed cameras—to the operator or technician—to image slots with high, consistent composite imaging values over this sequence of scan cycles. Additionally or alternatively, the remote computer system can then compare these layers and/or composite imaging values and recommend installation of fixed cameras to image slots that exhibit high variance in composite imaging value (or high variance in image fidelity in particular) over time.

After fixed cameras are installed in the store, the remote computer system can continue to execute this process over time and can: selectively recommend installation of additional fixed cameras to image new, high-composite-value slots (e.g., exceeding the threshold score) throughout the store; and/or recommend replacement of an installed fixed camera to a different location to image a different high-composite-value slot as composite imaging values of these slots change over time.

17.1 Post Hoc Fixed Camera Deployment

Alternatively, the robotic system: can be deployed to the store; can autonomously execute a sequence of scan cycles in the store over time; and can collect photographic images, wireless site surveys, lighting surveys, spatial data, etc. from the store over time. As the remote computer system executes the foregoing methods and techniques to derive stock conditions of inventory structures throughout the store from these data collected by the robotic system during these scan cycles, the remote computer system can also qualify these data and predict improvement in inventory tracking through access to images from fixed cameras installed at a (small) number of target locations within the store, as shown in FIGS. 4 and 7.

For example, the remote computer system can detect or track trends toward: lower confidence in detection and identification of products; poor or varying lighting conditions; poor or varying wireless connectivly; and/or poor or varying robotic system accessibility; etc. near a subset of inventory structures in the store based on data collected by the robotic system during these scan cycles. The remote computer system can then implement methods and techniques described above to: compile these data collected by the robotic system during these scan cycles into a composite heatmap representing value or compatibility of imaging inventory structures throughout the store with fixed cameras; identify a particular subset of slots or inventory structures throughout the store that exhibit high composite imaging values in this composite heatmap; and prompt the store manager, etc. to install fixed cameras in these locations, as described above.

In another example as shown in FIG. 7, the remote computer system can dispatch the robotic system to execute a sequence of scan cycles over time, such as once per day for a period of days, weeks, or months. For each scan cycle completed by the robotic system, the remote computer system can: access a set of images of the set of inventory structures in the store and a spatial map recorded by the robotic system during the scan cycle; derive a stock condition of the store at a time of the scan cycle; characterize fidelities of images in the set of images; and characterize accessibility of the set of inventory structures to the robotic system based on the spatial map. The remote computer system can then: generate an imaging viability heatmap (or modify the imaging viability heatmap described above) to reflect variance of fidelity of images recorded by the robotic system over this sequence of scan cycles; generate an accessibility heatmap (or modify the accessibility heatmap described above) to reflect both accessibility of regions of the store to the robotic system and variance of accessibility of the set of inventory structures to the robotic system over the sequence of scan cycles; and compile the imaging viability heatmap, the accessibility heatmap, etc. into a composite heatmap for the store. Accordingly, the remote computer system can generate a prompt to install fixed cameras to image particular inventory structures in the store in response to critical amplitudes (e.g., composite imaging values) in the composite heatmap—corresponding to these particular inventory structures—exceeding a threshold amplitude.

18. Fixed Camera Installation

The operator or technician, etc. may then install these fixed cameras throughout the store as recommended by the remote computer system, connect these fixed cameras to the wireless network in the store, and link these fixed cameras (e.g., UUIDs of these fixed cameras) to the store (e.g., to a store account assigned to the store).

Once these fixed cameras are installed at locations in the store thus suggested by the remote computer system, the remote computer system can coordinate: capture of images of a first set of inventory structures in the fields of view of these fixed cameras; and capture of images of a second set of inventory structures throughout the store by the robotic system. The remote computer system can then: derive stock conditions of the first set of inventory structures from images received from the set of fixed cameras; derive stock conditions of the second set of inventory structures from images received from the robotic system; fuse these stock conditions into a stock condition of the entire store; and then generate individual prompts to restock select slots throughout the store and/or populate a global restocking list for the store.

19. Fixed Camera Image Access

Figure 3:
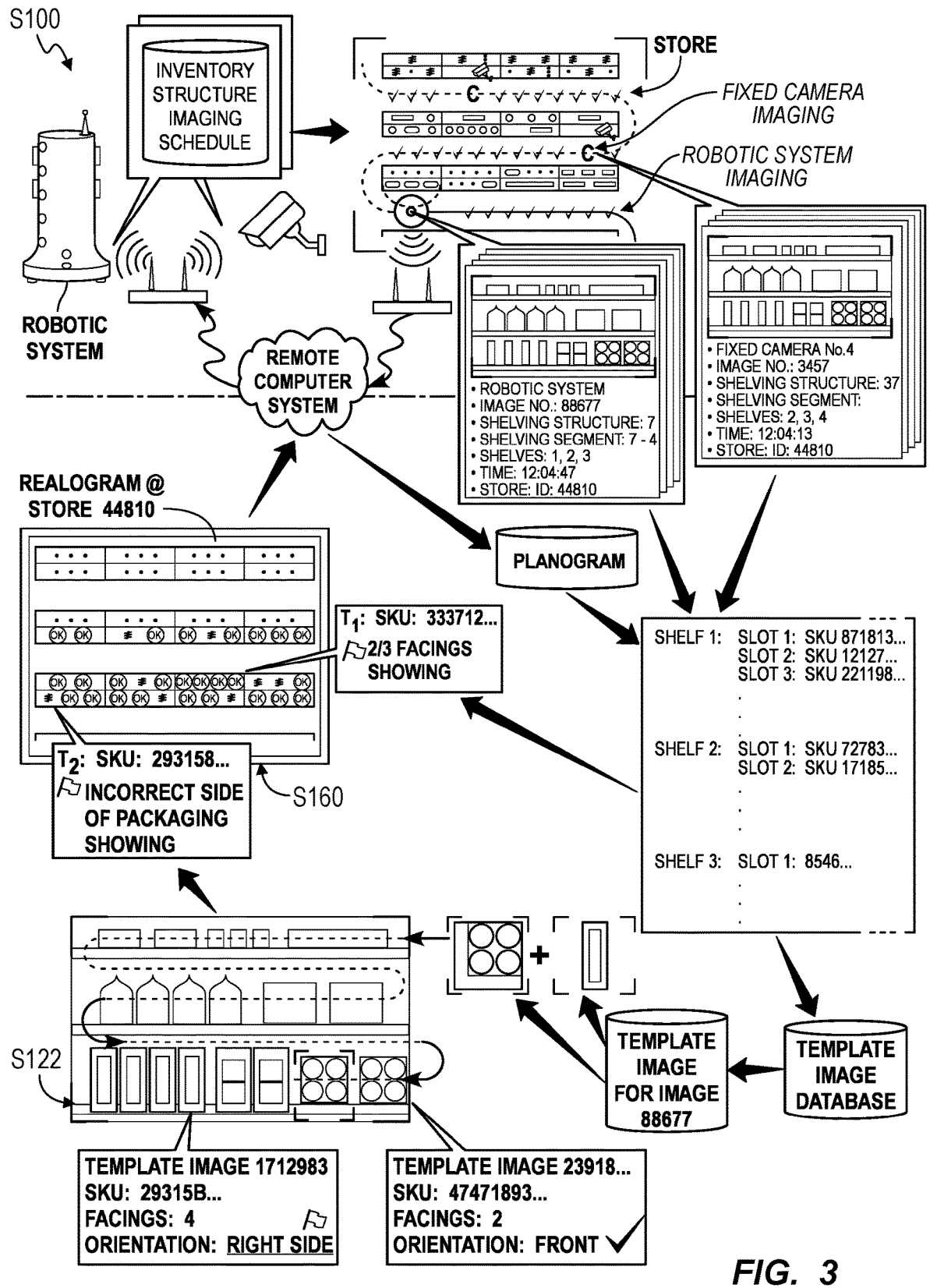
FIG. 3 is a flowchart representation of one variation of the method.

Once deployed, these fixed cameras can record images and return these images—labeled with timestamps and fixed camera identifiers—to the remote computer system (e.g., via the wireless network), such as on a regular interval of once per minute or once per hour, as shown in FIG. 3.

Additionally or alternatively, a fixed camera thus installed in the store can include a motion sensor defining a field of view intersecting the field of view of the camera. For example, throughout operation, the fixed camera can: set an imaging flag in response to detecting motion in a field of view of the first fixed camera at a first time; and then clear the imaging flag, capture an image of its adjacent inventory structure, and transmit the image to a remote computer system (e.g., via a local wireless network) in response to detecting absence of motion in its field of view (e.g., via the motion sensor) for a threshold duration of time succeeding the first time. Upon receipt of this image, the remote computer system can then: detect a product in the image; identify a product type of the product detected in the image; read a target product assigned to a slot—in the inventory structure occupied by the product—by a planogram of the store; and then serve a prompt to a computing device affiliated with a store associate to restock the slot in the first inventory structure in response to the product type deviating from the target product.

Yet alternatively, once these fixed cameras are connected to the remote computer system, the remote computer system can set and upload image capture schedules to these fixed cameras. For example, the remote computer system can specify an image capture frequency for a particular fixed camera proportional to composite imaging values (or product values more specifically, or monitoring frequencies) of slots that fall in the field of view of this fixed camera.

The remote computer system can then store these fixed camera images and process these images as described below in preparation for combination with data received from the robotic system during a next scan cycle after installation of these fixed cameras.

19.1 Fixed Camera Image Access via Robotic System

In one variation, for a fixed camera not connected to the wireless network in the store, exhibiting limited power availability, and/or outfitted with a lower-power wireless communication module, the fixed camera can: capture and store images locally; and then offload these images to the robotic system when the robotic system navigates near the fixed camera during scan cycles.

In one implementation, once deployed, fixed cameras: record images on a fixed interval or schedule; and store these images in local memory (e.g., buffer) until a next scan cycle executed by the robotic system. When executing a scan cycle following installation of these fixed cameras, the robotic system can regularly broadcast a query for fixed camera images. Upon receipt of this query from the robotic system, a fixed camera can transmit a batch of images stored in local memory to the robotic system and then clear these images from its local memory. The robotic system can then: tag these fixed camera images with the location of the robotic system in the store at time of receipt; and upload these fixed camera images (now labeled with timestamps, fixed camera identifiers, and approximate fixed camera locations in the store) to the remote server for processing, such as in real-time or upon completion of the scan cycle.

For example, a first fixed camera—in a number of fixed cameras installed in the store—can record a first image of a first inventory structure in the store and store this first image of the first inventory structure in local memory. During a later or concurrent scan cycle, the robotic system can: navigate proximal the first inventory structure; query the fixed camera for images stored in memory; download the first image from the first fixed camera; navigate proximal a second inventory structure scheduled for imaging by the robotic system; record a second image of the second inventory structure; and transmit the first image and the second image to a remote computer system. Upon receipt of these images from the robotic system, the remote computer system can: detect a first product in the first image; identify a first product type of the first product detected in the first image; detect a second product in the second image; identify a second product type of the second product detected in the second image; and calculate a stock condition of the store during this scan cycle based on the first product type detected in the first inventory structure and the second product type detected in the second inventory structure.

Alternatively, upon receipt of a query from the robotic system, a fixed camera can capture an image, tag this image with a timestamp and fixed camera identifier, and transmit this image back to the robotic system. The robotic system can then: tag this fixed camera image with the location of the robotic system at time of receipt form the fixed camera; and upload this fixed camera image to the remote server.

However, the remote computer system can access a set of fixed camera images from these fixed cameras in any other way following installation of these fixed cameras in the store.

20. Scan Cycle and Product Detection in Robotic System Images

During a scan cycle following installation of fixed cameras in the store, the robotic system can again navigate autonomously throughout the store and record images of inventory structures throughout the store, such as: all inventory structures; all inventory structures that are accessible to the robotic system during this scan cycle; or a subset of inventory structures throughout the store not otherwise designated for monitoring by the set of installed fixed cameras, as shown in FIG. 3.

Upon accessing these robotic system images from the robotic system, such as in real-time during the scan cycle or following completion of the scan cycle, the remote computer system can process these images as described above to detect and identify products stocked on these inventory structures. Upon receipt of fixed camera images—such as directly from a fixed camera or from the robotic system during a next scan cycle—the remote computer system can again implement methods and techniques described above to detect products depicted in these images, as shown in FIG. 6.

21. Fixed Camera Automatic Localization

In one variation, the remote computer system automatically determines locations of (or "localizes") fixed cameras installed in the store based on alignment between: products detected in images received from these fixed cameras; and products detected in approximately concurrent images recorded by the robotic system or depicted in a planogram of the store.

In one implementation, the remote computer system implements methods and techniques described above to transform a set of images recorded by the robotic system during a last scan cycle into a realogram of the store. Upon receipt of a set of images recorded by a fixed camera recently installed in the store, the remote computer system: selects a particular fixed camera image with a timestamp nearest a time of the last robotic system scan cycle; detects products in the particular fixed camera image; generates a list of products depicted in the particular fixed camera image; and scans the last realogram of the store for an inventory structure containing every product in the list. The remote computer system can then associate this fixed camera with a single contiguous inventory structure section stocked with a greatest number (and more than a minimum proportion, such as 90%) of products on this list.

Additionally or alternatively, the remote computer system can: extract a constellation of product identifiers and product locations from the particular fixed camera image; scan the realogram for a contiguous inventory structure section containing a nearest approximation of this constellation of products; and then associate this fixed camera with this contiguous inventory structure section. Furthermore, in this implementation, the remote computer system can: calculate a transform that projects and aligns this constellation of products extracted from the particular fixed camera image onto the corresponding products stocked in the contiguous inventory structure section; and then estimate a location and orientation of the fixed camera in the store based on a known location of the contiguous inventory structure section in the store and this transform. The remote computer system can similarly calculate a boundary of the field of view of the fixed camera based on this transform and/or based on products detected—and not detected—in the particular fixed camera image versus products stocked on the corresponding inventory structure.

In the foregoing implementation, the remote computer system can further limit or prioritize a search for alignment between products detected in the particular fixed camera image and products depicted in the realogram: to inventory structures near locations of fixed cameras previously recommended to the operator or technician, as described above; and/or to inventory structures near the location of the robotic system upon receipt of these particular fixed camera images from the fixed camera.

In the foregoing implementations, the remote computer system can implement similar methods and techniques to compare products detected in the particular fixed camera image: directly to images recorded by the remote computer system (e.g., when occupying locations or waypoints near a location at which the robotic system received this particular fixed camera image); or to products depicted in the planogram of the store.

Therefore, the remote computer system can identify a location of the fixed camera, the field of view of the fixed camera, and/or the inventory structure segment (and therefore shelving structure, shelving segment, shelf, and/or slot identify) that falls in the field of view of the fixed camera. The remote computer system can also label this inventory structure segment (or shelving structure, shelving segment, shelf, and/or slot specifically)—represented in the planogram or other representation of the store—with a unique identifier (e.g., a UUID) of this fixed camera.

The remote computer system can repeat this process for each other fixed camera deployed in the store in order to automatically configure these fixed cameras.

22. Imaging Obligation Distribution

In one variation shown in FIG. 2, upon linking the fixed cameras to discrete inventory structure segments in the store, the remote computer system can assign imaging responsibilities to these fixed cameras and to the robotic system.

In one implementation, the remote computer system: identifies a first subset of inventory structures in the store (e.g., equal to a quantity of fixed cameras allocated to the store) occupying a first set of locations corresponding to critical amplitudes (e.g., highest sums of composite imaging values) in the composite heatmap; and then generates a prompt to install this number of fixed cameras facing this first subset of inventory structures in the store. Once the fixed cameras are installed in the store, the remote computer system can: verify a second subset of inventory structures occupying a second set of locations corresponding to amplitudes (e.g., lower sums of composite imaging values) less than critical amplitudes—corresponding to the first set of locations—in the composite heatmap; schedule the second subset of inventory structures for imaging by the robotic system during a second scan cycle succeeding the first scan cycle; and similarly schedule the first subset of inventory structures for imaging by the number of fixed cameras installed in the store.

In another implementation, the remote computer system assigns a first subset of inventory structure segments—that do not fall in the field of view of at least one fixed camera—to the robotic system. Thus, during subsequent scan cycles, the robotic system can selectively image this first subset inventory structure segments; and the fixed cameras can image the remaining second subset of inventory structure segments in the store. The remote computer system can then implement methods and techniques described above to access images from the robotic system and the fixed cameras, to detect and identify products in these images, and to compile these data into a realogram of the store. Therefore, in this implementation, the robotic system may scan a smaller proportion of the store during a scan cycle and thus complete this scan cycle in less time; accordingly, the remote computer system can deploy the robotic system to execute scan cycles in the store at higher frequency and combine images collected by the robotic system with images received from fixed cameras to generate lower-latency realograms of the store.

In another implementation, upon associating a fixed camera and an inventory structure segment, the remote computer system can set or adjust an image capture schedule for this fixed camera. For example, the remote computer system can define an image capture schedule that specifies an image frequency proportional to a value of products assigned to slots in the field of view of the fixed camera; proportional to temperature sensitivity of these products; proportional to sale rate of these products per 24-hour period; or proportional to historical patron occupancy in the store per 24-hour period. The remote computer system can then transmit this schedule to the fixed camera directly via the wireless network in the store. Alternatively, the robotic system can broadcast this schedule update to the fixed camera during a next scan cycle.

However, the remote computer system can implement any other method or schema to allocate imaging obligations for inventory structures throughout the store between the fixed cameras and the robotic system.

23. Stock Tracking

Subsequently, the remote computer system can: access images recorded by the robotic system during a scan cycle; access images recorded approximately concurrently (e.g., during or around the time of this scan cycle) by the fixed cameras; detect and identify products in these images; and merge these data into a complete realogram of the store, as shown in FIG. 3.

Additionally or alternatively, in the variation of the fixed camera that broadcasts images to a wireless router or gateway in the store rather than to the robotic system, the remote computer system can implement similar methods and techniques to generate partial realograms for inventory structures depicted in images received from these fixed cameras.

The remote computer system can then selectively serve targeted restocking notification and a global restocking list to associates of the store based on these complete and partial realograms.

24. Fixed Camera Recharging

In one variation in which a fixed camera deployed to the store is not wired to an external power supply and is instead outfitted with a wireless or inductive charging module, the robotic system can: navigate to a location near thus fixed camera during a scan cycle; rotate to align a wireless or inductive charger toward the fixed camera; and then broadcast a power signal to the fixed camera to recharge a battery inside the fixed camera. In this variation, the robotic system can thus function as a mobile, wireless charger for this fixed camera, thereby reducing need for fixed power infrastructure in the store when this fixed camera is deployed.

In one implementation, the robotic system broadcasts a power signal to recharge a fixed camera nearby immediately before, immediately after, or while downloading a batch of images from this fixed camera. For example, to limit power consumption, the fixed camera can offload images to the robotic system via low-power, low-bandwidth, short-range wireless communication protocol when the robotic system is nearby. In this example, the robotic system can recharge this fixed camera with sufficient energy for the fixed camera to: activate the optical sensor; capture an image; store this image in memory; transition to a low-power mode; repeat this process on an interval or schedule, as described above, until a next scheduled scan cycle by the robotic system, and then upload these images from to robotic system. Additionally or alternatively, the robotic system can recharge the fixed camera with sufficient energy for the fixed camera to: record a target number of (e.g., ten) images; and upload these images in real-time or in-batch to a fixed wireless router in store (rather than to the robotic system).

25. Robotic System and Fixed Camera Cooperation

Therefore, in the foregoing implementations: fixed sensors can be arranged at target locations throughout the store to capture images of a first subset of inventory structures that exhibit poor accessibility for the robotic system, that are stocked with high-value or high-sale-rate products, and/or that are poorly lit, etc.; and the remote computer system accesses images captured by these fixed cameras at a first rate (or within a first rate range such as between one image per minute and one image per hour) and interprets stock conditions of this first subset of inventory structures at this first rate (or within this first rate range) based on these fixed camera images.

In the foregoing implementations, the remote computer system also: dispatch the robotic system to navigate throughout the store and capture images of a second subset of inventory structures in the store during a scan cycle, such as once per four-hour interval; and interprets stock conditions of the second subset of inventory structures at this second rate (e.g., once per four-hour interval) based on robotic system images received from the robotic system during this scan cycle. The remote computer system can then fuse these derived inventory structure stock conditions to form a (more) complete record of the stock condition of the store, as shown in FIG. 3.

25.1 Redundant Imaging

In one variation, during a scan cycle in which the robotic system accesses and images an inventory structure also imaged by a fixed camera installed in the store, the robotic system (or the remote computer system) can also trigger the fixed camera to capture a fixed camera image of the inventory structure concurrently within—or within a threshold duration of time (e.g., within five seconds) of—recordation of a robotic system image of the first inventory structure by the robotic system. The remote computer system can then: implement methods and techniques described above to detect and identify products in this fixed camera image; and store these product detection and identification results derived from this fixed camera image as a ground truth state of the inventory structure during this scan cycle. The computer system can also: implement methods and techniques described above to detect and identify products in the corresponding robotic system image; and compare these product detection and identification results derived from this robotic system image to the ground truth state of the inventory structure during this scan cycle. Accordingly, the remote computer system can verify operation of the robotic system and robotic system image processing if product detection and identification results derived from this robotic system image align with the ground truth state of the inventory structure during the scan cycle. Conversely the remote computer system can prompt an operator, store manager, etc. to recalibrate the robotic system or otherwise investigate operation of the robotic system and fixed camera.

Therefore, in this variation, the robotic system and the fixed camera installed in the store can form a redundant system, and the remote computer system can verify operation of the robotic system and the fixed camera based on alignment of product data derived from (approximately) concurrent images captured thereby.

25.2 Distinct Robotic System and Fixed Camera Operation

Alternatively, fixed cameras can be installed in checkout aisles in the store, such as facing "impulse buy" goods stocked in these checkout aisles. In this variation, the remote computer system can queue the robotic system to navigate along and to image primary inventory structures throughout the remainder of the store during scan cycles (e.g., in a "primary floor area" in the store). Therefore, in this variation, the remote computer system can: derive stock conditions of checkout aisles from images captured by these fixed cameras; and derive stock conditions of the remainder of the store from images captured by the robotic system during a scan cycle.

In this variation, the remote computer system can also download images directly from these fixed cameras when travelling past checkout aisles in the store during a scan cycle and can then offload these fixed cameras images to the remote computer system for processing, such as described above for fixed cameras not connected to fixed electrical infrastructure.

Therefore, in this variation, the store can be outfitted with a robotic system configured to scan inventory structures throughout the store but restricted from certain areas within the store, such as checkout aisles and food preparation areas. In this variation, the store can also be outfitted with fixed cameras in checkout aisles and other locations not accessible to the robotic system. The remote computer system can then derive stock conditions of inventory structures throughout the store from images captured by the robotic system and fixed cameras and fuse these data into a (more) complete repetition of the stock condition of the store, including inventory structures in both a main floor area of the store and in checkout aisles in the store.

26. Variation: Fixed Cameras Only

In one variation, the robotic system is temporarily provisioned to a store (e.g., a convenience store or grocer with less than 2,000 square feet of floor space) to execute an initial scan cycle as described above. The remote computer system then compiles data collected by the robotic system during the initial scan cycle to identify a set of target locations for a (small) number of fixed cameras in the store.

In one implementation, the robotic system executes an initial scan cycle when temporarily provisioned to the store, including: generating or capturing a spatial map of the store, a wireless site survey of the store, a lighting map for the store, and/or a ceiling map of the store; and/or capturing photographic images of inventory structures throughout the store. The remote computer system then implements methods and techniques described above: to transform these images into a realogram of the store; to generate an imaging viability heatmap of the store, an electrical infrastructure heatmap a product value heatmap, a frequency monitoring heatmap, and/or a lighting heatmap for the store; to fuse these heatmaps into a composite heatmap for the store; and to isolate a subset of inventory structures (e.g., clusters of slots, discrete shelving segments) exhibiting highest composite imaging values in the composite heatmap. The remote computer system can then generate recommendations for installation of a set of fixed cameras—such as up to a threshold quantity of fixed cameras available to the store—at a set of target locations to image these inventory structures with highest composite imaging values.

Once installed at these target locations, these fixed cameras can capture images of these inventory structures and upload these images to the remote computer system, such as on regular intervals or in response to detecting nearby motion, as described above. The remote computer system can then: derive stock conditions of inventory structures—in the fields of view of the fixed cameras—from these images; and update partial realograms for these inventory structures to reflect these stock conditions. The remote computer system can also generate discrete prompts to restock or reorder particular slots in the store, such as in response to detecting: an out-of-stock condition (i.e., no product present) in a particular slot; an understock condition (i.e., fewer than a target number of product facings present) in a particular slot; an improper stock condition (i.e., presence of a product different from an assigned product type) in a particular slot; and/or a disordered condition (i.e., correct products present but disorderly or "messy") in a particular slot. Additionally or alternatively, the remote computer system can populate a partial-global restocking list—including types and/or qualities of particular products to restock—for all slots imaged by these fixed cameras.

However, in this variation, the remainder of slots and inventory structures throughout the store can be manually inventoried and managed by store associates. Therefore, in this variation, the robotic system and the remote computer system can cooperate to identify target locations for a (small) number fixed cameras: to monitor high-value slots in the store that consistently yield sufficient light for autonomous monitoring via fixed cameras and/or that require minimal fixed infrastructure improvements (e.g., wireless connectivity and/or electrical access) to enable fixed camera deployment. Once installed in the store at these target locations, these fixed cameras can cooperate with the remote computer system to monitor a subset (e.g., 10%) of inventory structures throughout the store while store associates manually monitor the remainder of the store.

In this variation, the remote computer system and these fixed cameras can therefore cooperate to augment manual inventory auditing in the store by tracking inventory of high-value slots (or slots that exhibit a sufficient balance between product value, lighting, wireless connectivity, and/or electrical access) in the store with lower latency (e.g., automatically once per minute rather than manually once per day).

27. Variation: Manual Initial Scan Cycle

In one variation, rather than deploying the robotic system to autonomously scan a store, an operator manually manipulates a sensor suite throughout a store to manually collect survey data, such as: a spatial map of the store; a wireless site survey of the store; a lighting map for the store; a ceiling map of the store; and/or photographic images of inventory structures throughout the store.

For example, an operator may walk through the store with a mobile computing device (e.g., a smartphone, a tablet) while manipulating the mobile computing device through a range of orientations during a manual scan cycle to locate floor areas, ceiling areas, walls, and inventory structures in the store in the field of view of a camera in the mobile computing device. During this manual scan period, the mobile computing device can implement methods and techniques similar to those described above: to capture 2D photographic images and/or depth images of surfaces and inventory structure within the store; to transform these 2D photographic images and/or depth images into a spatial map of the store; to test wireless connectively and construct a wireless site survey of the store; and to test ambient light levels and construct a lighting survey of the store. The remote computer system can then implement methods and techniques described above to transform these data captured by the mobile computing device during this manual scan cycle into a composite heatmap of the store and to identify target locations for installation of a set of fixed cameras throughout the store.

28. Security Cameras

In the variation described above in which the robotic system records a sequence of ceiling images during the initial scan cycle, the remote computer system can also implement computer vision, artificial intelligence, or deep learning techniques to identify, locate, and count numbers of security cameras, light fixtures, wireless routers, pipes, cable bundles, and/or vents, etc. in the store. The remote computer system can then annotate the ceiling map with these data or serve these infrastructure data to the operator or technician in the form of a table. For example, the remote computer system can: estimate regions of the store that fall in the field of view of at least one security camera based on location of these security cameras in the store and supplied or detected model numbers of the security cameras; isolate unmonitored regions of the store that do not fall in the field of view of at least one of these security cameras; and then prompt the operator or store manager to add security cameras over these unmonitored regions or to rearrange security cameras to reduce these unmonitored gaps.)

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for deploying fixed cameras within a store comprising, by a computer system:
   generating a product value heatmap for the store based on locations and sales volumes of a set of products assigned to a set of inventory structures within the store;
   for each inventory structure in the set of inventory structures, calculating a fixed camera score, in a set of fixed camera scores, for imaging the inventory structure with a fixed camera according to an amplitude represented in the product value heatmap at a location corresponding to the inventory structure
   prompting prioritization of installation of fixed cameras in the store to image the set of inventory structures according to the set of fixed camera scores.

2. The method of claim 1:
   further comprising:
      dispatching a robotic system to autonomously navigate along the set of inventory structures in the store and generate a spatial map of the store during a scan cycle;

generating an accessibility heatmap representing accessibility of regions of the store to the robotic system based on the spatial map; and generating a composite heatmap for the store based on the product value heatmap and the accessibility heatmap, the composite heatmap comprising a gradient of amplitudes representing practicality of fixed cameras to image the set of inventory structures throughout the store; and wherein calculating the fixed camera score for each inventory structure in the set of inventory structures comprises, for each inventory structure in the set of inventory structures, calculating a fixed camera score, in the set of fixed camera scores, for imaging the inventory structure with a fixed camera according to an amplitude represented in the composite heatmap at a location corresponding to the inventory structure.

3. The method of claim 2, wherein generating the accessibility heatmap comprises:

detecting the set of inventory structures in the spatial map;

for each inventory structure in the set of inventory structures:

detecting an aisle adjacent the inventory structure in the spatial map;

identifying an open end of the aisle in the spatial map;

extracting a distance from the inventory structure to the open end of the aisle from the spatial map; and calculating an accessibility score, in a set of accessibility scores, for the inventory structure proportional to the distance; and aggregating the set of accessibility scores into the accessibility heatmap based on locations of the set of inventory structures represented in the spatial map.

4. The method of claim 2:

further comprising:

dispatching the robotic system to execute a sequence of scan cycles prior to the first scan cycle;

for each scan cycle in the sequence of scan cycles:

accessing a set of images of the set of inventory structures and a spatial map recorded by the robotic system during the scan cycle;

deriving a stock condition of the store at a time of the scan cycle;

characterizing fidelities of images in the set of images; and characterizing accessibility of the set of inventory structures to the robotic system based on the spatial map; and generating an imaging viability heatmap representing variance of fidelity of images of the set of inventory structures over the sequence of scan cycles;

wherein generating the accessibility heatmap comprises generating the accessibility heatmap representing accessibility of regions of the store to the robotic system and variance of accessibility of the set of inventory structures to the robotic system over the sequence of scan cycles;

wherein generating the composite heatmap for the store comprises generating the composite heatmap for the store further based on the imaging viability heatmap; and wherein prompting prioritization of installation of fixed cameras in the store comprises prompting prioritization of installation of fixed cameras in the store in response to critical amplitudes in the composite heatmap, corresponding to locations of the subset of inventory structures in the store, exceeding a threshold amplitude.

5. The method of claim 1, wherein generating the product value heatmap comprises:

for each slot in each inventory structure in the set of inventory structures in the store:

accessing a corpus of historical sales data for a product assigned to the slot by a planogram of the store;

deriving a sale frequency of the product from the corpus of historical sales data;

detecting a slot quantity of units of the product assigned to the slot by the planogram;

retrieving a total quantity of units of the product assigned to all slots in the store;

calculating a normalized quantity of units of the product based on a ratio of the slot quantity of units of the product assigned to the slot to the total quantity of units of the product assigned to all slots in the store; and calculating a frequency monitoring value, in a set of frequency monitoring values, for the slot based on a ratio of the sale frequency of the product to the normalized quantity of units of the product; and aggregating the set of frequency monitoring values into the product value heatmap based on locations of slots in the set of inventory structures and locations of the set of inventory structures in the store.

6. The method of claim 1, wherein generating the product value heatmap comprises:

for each slot in each inventory structure in the set of inventory structures in the store:

accessing a corpus of historical sales data for a product assigned to the slot by a planogram of the store;

deriving a sale frequency of the product from the corpus of historical sales data;

accessing a margin of the product;

calculating a product value, in a set of product values, of the product based on a combination of the sale frequency of the product and the margin of the product; and associating the product value with the slot; and aggregating the set of product values into the product value heatmap based on locations of slots in the set of inventory structures and locations of the set of inventory structures in the store.

7. The method of claim 1:

further comprising:

dispatching a robotic system to autonomously navigate along a set of inventory structures in the store and generate a spatial map of the store during a first scan cycle;

generating an accessibility heatmap representing accessibility of regions of the store to the robotic system based on the spatial map;

accessing a number of fixed cameras allocated to the store;

generating a composite heatmap for the store based on the accessibility heatmap and the product value heatmap; and identifying a first subset of inventory structures, in the set of inventory structures within the store, occupying a first set of locations corresponding to critical amplitudes in the composite heatmap, the first subset of inventory structures containing a quantity of inventory structures equal to the number of fixed cameras; and wherein prompting prioritization of installation of fixed cameras in the store to image the set of inventory structures according to the set of fixed camera scores comprises prompting prioritization of installation of the number of fixed cameras in the store to image the first subset of inventory structures according to the set of fixed camera scores.

8. The method of claim 7:
wherein dispatching the robotic system comprises dispatching the robotic system to further capture wireless network connectivity data while autonomously navigating through the store during the first scan cycle;
further comprising:
  generating a wireless connectivity heatmap for the store based on wireless network connectivity data captured by the robotic system during the first scan cycle;
  assigning a first weight to the product value heatmap;
  assigning a second weight to the wireless connectivity heatmap, the second weight less than the first weight; and
  assigning a third weight to the accessibility heatmap, the third weight comprising a negative value, an absolute value of the third weight greater than the first weight;
wherein generating the composite heatmap comprises compiling the product value heatmap, the wireless connectivity heatmap, and the accessibility heatmap according to the first weight, the second weight, and the third weight, the composite heatmap comprising a gradient of amplitudes representing practicality of fixed cameras to image the set of inventory structures throughout the store; and
wherein identifying the first subset of inventory structures comprises identifying the first subset of inventory structures intersecting clusters of greatest aggregate amplitudes in the composite heatmap.

9. The method of claim 7, further comprising:
identifying a second subset of inventory structures, in the set of inventory structures within the store, occupying a second set of locations corresponding to amplitudes in the composite heatmap less than critical amplitudes corresponding to the first set of locations;
scheduling the second subset of inventory structures for imaging by the robotic system during a second scan cycle succeeding the first scan cycle; and
scheduling the first subset of inventory structures for imaging by the number of fixed cameras installed in the store.

10. The method of claim 9, further comprising:
at a first fixed camera in the number of fixed cameras installed in the store:
  recording a first image of a first inventory structure in the subset of inventory structures; and
  storing the first image of the first inventory structure in local memory;
at the robotic system, during a second scan cycle:
  navigating proximal the first inventory structure;
  querying the fixed camera for images stored in memory;
  downloading the first image from the first fixed camera;
  navigating proximal a second inventory structure in the second subset of inventory structures;
  recording a second image of the second inventory structure; and
  transmitting the first image and the second image to a remote computer system; and
at the remote computer system:
  detecting a first product in the first image;
  identifying a first product type of the first product detected in the first image;
  detecting a second product in the second image;
  identifying a second product type of the second product detected in the second image; and
  calculating a stock condition of the store during the second scan cycle based on the first product type detected in the first inventory structure and the second product type detected in the second inventory structure.

11. The method of claim 7, further comprising:
at a first fixed camera, in the number of fixed cameras, facing a first inventory structure in the first subset of inventory structures:
  in response to detecting motion in a field of view of the first fixed camera at a first time, setting an imaging flag; and
  in response to detecting absence of motion in the field of view of the first fixed camera for a threshold duration of time succeeding the first time:
    clearing the imaging flag;
    capturing an image of the first inventory structure; and
    transmitting the image to a remote computer system; and
at the remote computer system:
  detecting a product in the image;
  identifying a product type of the product detected in the image;
  reading a target product assigned to a slot, in the first inventory structure occupied by the product, by a planogram of the store; and
  in response to the product type deviating from the target product, serving a prompt to a computing device affiliated with a store associate to restock the slot in the first inventory structure.

12. A method for deploying fixed cameras within a store comprising:
by a computer system:
  accessing a number of fixed cameras, allocated to the store, configured to source power from fixed electrical infrastructure in the store;
  accessing a map of electrical infrastructure in the store;
  generating an electrical infrastructure heatmap representing proximity to fixed electrical infrastructure in the store based on the map of electrical infrastructure in the store;
  accessing a spatial map of a set of inventory structures within the store;
  detecting faces of shelves in the set of inventory structures in the spatial map;
  representing a set of camera mounting locations in a camera mount map for the store based on locations of faces of shelves in the set of inventory structures extracted from the first spatial map;
  generating a composite heatmap for the store based on the electrical infrastructure heatmap and the camera mount heatmap, the composite heatmap comprising a gradient of amplitudes representing practicality of fixed cameras to image the set of inventory structures throughout the store;
  identifying a first subset of inventory structures, in the set of inventory structures within the store, occupying a first set of locations corresponding to critical amplitudes in the composite heatmap, the first subset of inventory structures containing a quantity of inventory structures equal to the number of fixed cameras; and generating a prompt to install the number of fixed cameras facing the first subset of inventory structures in the store.

13. The method of claim 12:

wherein identifying the first subset of inventory structures comprises:
for each camera mounting location in the set of camera mounting locations:
selecting a first camera location from the camera mount map;
calculating a field of view of a fixed camera located at the first location based on properties of the fixed camera;
projecting the field of view of the fixed camera onto the composite heatmap; and
calculating a sum of amplitudes, in the composite heatmap, intersecting the field of view of the fixed camera projected onto the composite heatmap; and
identifying a subset of fixed camera locations, in the camera mount map, that yield fields of view that intersect highest sums of amplitudes in the composite heatmap; and
wherein generating the prompt to install the number of fixed cameras facing the first subset of inventory structures in the store comprises generating the prompt to install the number of fixed cameras in the subset of fixed camera locations.

14. The method of claim 12, further comprising:
dispatching a robotic system to capture a sequence of images of a ceiling of the store while autonomously navigating through the store during a first scan cycle;
assembling the sequence of images into a composite image of the ceiling of the store;
detecting electrical conduit and electrical outlets in the composite image of the ceiling of the store; and
aggregating locations of electrical conduit and electrical outlets detected in the composite image of the ceiling of the store into the map of electrical infrastructure in the store.

15. The method of claim 14:
further comprising, for each discrete location in a set of discrete location throughout the store:
calculating a first distance from the discrete location to an electrical outlet represented in the map of electrical infrastructure;
calculating a second distance from the discrete location to an electrical conduit represented in the map of electrical infrastructure; and
calculating an electrical accessibility score for the discrete location based on a combination of the first distance assigned a first weight and the second distance assigned a second weight, the first weight greater than the second weight; and
wherein generating the electrical infrastructure heatmap comprises aggregating electrical accessibility scores, for the set of discrete locations, into the electrical infrastructure heatmap.

16. The method of claim 12:
further comprising:
assigning a first weight to the electrical infrastructure heatmap; and
assigning a second weight to the camera mount heatmap, the second weight less than the first weight;

wherein generating the composite heatmap comprises compiling the electrical infrastructure heatmap and the camera mount heatmap according to the first weight and the second weight; and wherein identifying the first subset of inventory structures comprises identifying the first subset of inventory structures intersecting clusters of highest aggregate amplitudes in the composite heatmap.

17. The method of claim 12:
further comprising:
dispatching a robotic system to autonomously navigate along the set of inventory structures in the store and generate a spatial map of the store during a scan cycle;
generating an accessibility heatmap representing accessibility of regions of the store to the robotic system based on the spatial map;
assigning a first weight to the electrical infrastructure heatmap;
assigning a second weight to the camera mount heatmap, the second weight less than the first weight; and
assigning a third weight to the accessibility heatmap, the third weight comprising a negative value, an absolute value of the third weight less than the first weight;
wherein generating the composite heatmap comprises compiling the electrical infrastructure heatmap, the camera mount heatmap, and the accessibility heatmap according to the first weight, the second weight, and the third weight to generate the composite heatmap comprising a gradient of amplitudes representing practicality of fixed cameras to image the set of inventory structures throughout the store; and
wherein identifying the first subset of inventory structures comprises identifying the first subset of inventory structures intersecting clusters of highest aggregate amplitudes in the composite heatmap.

18. The method of claim 12, further comprising:
generating a product value heatmap for the store based on locations and sales volumes of a set of products assigned to a set of inventory structures within the store; and
wherein generating the composite heatmap comprises generating the composite heatmap further based on the product value heatmap.

19. The method of claim 18, wherein generating the product value heatmap comprises:
for each slot in each inventory structure in the set of inventory structures in the store:
accessing a corpus of historical sales data for a product assigned to the slot by a planogram of the store;
deriving a sale frequency of the product from the corpus of historical sales data;
detecting a slot quantity of units of the product assigned to the slot by the planogram;
retrieving a total quantity of units of the product assigned to all slots in the store;
calculating a normalized quantity of units of the product based on a ratio of the slot quantity of units of the product assigned to the slot to the total quantity of units of the product assigned to all slots in the store; and
calculating a frequency monitoring value, in a set of frequency monitoring values, for the slot based on a ratio of the sale frequency of the product to the normalized quantity of units of the product; and aggregating the set of frequency monitoring values into the product value heatmap based on locations of slots in the set of inventory structures and locations of the set of inventory structures in the store.

20. The method of claim 18, wherein generating the product value heatmap comprises:
for each slot in each inventory structure in the set of inventory structures in the store:
accessing a corpus of historical sales data for a product assigned to the slot by a planogram of the store;
deriving a sale frequency of the product from the corpus of historical sales data;
accessing a margin of the product;
calculating a product value, in a set of product values, of the product based on a combination of the sale frequency of the product and the margin of the product; and
associating the product value with the slot; and
aggregating the set of product values into the product value heatmap based on locations of slots in the set of inventory structures and locations of the set of inventory structures in the store.

\* \* \* \* \*